United States Patent
Lehmann et al.

(10) Patent No.: US 9,183,512 B2
(45) Date of Patent: Nov. 10, 2015

(54) REAL-TIME ANOMALY DETECTION OF CROWD BEHAVIOR USING MULTI-SENSOR INFORMATION

(71) Applicant: Northeastern University, Boston, MA (US)

(72) Inventors: Oliver Lehmann, Cambridge, MA (US); Gilead Tadmor, Cambridge, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 14/365,494

(22) PCT Filed: Dec. 17, 2012

(86) PCT No.: PCT/US2012/070149
§ 371 (c)(1),
(2) Date: Jun. 13, 2014

(87) PCT Pub. No.: WO2013/090910
PCT Pub. Date: Jun. 20, 2013

(65) Prior Publication Data
US 2014/0372348 A1 Dec. 18, 2014

Related U.S. Application Data

(60) Provisional application No. 61/576,198, filed on Dec. 15, 2011.

(51) Int. Cl.
*G06N 5/00* (2006.01)
*G06F 1/00* (2006.01)
(Continued)

(52) U.S. Cl.
CPC .......... *G06N 99/005* (2013.01); *G06K 9/00778* (2013.01); *G06K 9/6265* (2013.01); *G06K 9/6284* (2013.01); *G06N 5/04* (2013.01); *G06K 9/6218* (2013.01)

(58) Field of Classification Search
CPC .............................. G06Q 30/02; G06Q 10/10
See application file for complete search history.

(56) References Cited

U.S. PATENT DOCUMENTS

| 7,558,404 B2 | 7/2009 | Ma et al. |
| 8,009,863 B1 | 8/2011 | Sharma et al. |

(Continued)

OTHER PUBLICATIONS

Baker, S. and Matthews, I., "Lucas-Kanade 20 Years On: A Unifying Framework," International Journal of Computer Vision, vol. 56, No. 3, pp. 221-255 (2004).

(Continued)

*Primary Examiner* — Jeffrey A Gaffin
*Assistant Examiner* — Kalpana Bharadwaj
(74) *Attorney, Agent, or Firm* — Wilmer Cutler Pickering Hale and Dorr LLP

(57) ABSTRACT

The present disclosure includes systems and methods for detecting an anomaly in crowd behavior. The method includes receiving sensor data representing a crowd, and partitioning the sensor data into local areas forming neighborhoods. The method further includes, for each local area, characterizing motion in the local area to determine real-time estimates of motion of sub-populations based on the sensor data, providing a crowd model for each local area, representing continuous functions describing expected motion near each local area, and determining parametric values of the crowd model based on the real-time estimates of the motion of the sub-populations. The method further includes learning and adapting auxiliary stochastic models characterizing normal evolution of the parametric values of the crowd model over time associated with each local area, and identifying a potential anomaly associated with the local area by comparing predictions from an auxiliary stochastic model with parametric values of the crowd model.

20 Claims, 7 Drawing Sheets

(51) Int. Cl.
  *G06N 99/00* (2010.01)
  *G06K 9/62* (2006.01)
  *G06K 9/00* (2006.01)
  *G06N 5/04* (2006.01)

(56) References Cited

U.S. PATENT DOCUMENTS

| | | | |
|---|---|---|---|
| 2003/0058339 | A1 | 3/2003 | Trajkovic et al. |
| 2008/0175482 | A1 | 7/2008 | Ma et al. |
| 2009/0222388 | A1 | 9/2009 | Hua et al. |
| 2011/0191078 | A1 | 8/2011 | Davidich et al. |
| 2014/0350840 | A1* | 11/2014 | D'Argenio et al. ........... 701/409 |
| 2014/0372160 | A1* | 12/2014 | Nath et al. ................... 705/7.13 |

OTHER PUBLICATIONS

Brax, et al., "An Ensemble Approach for Increased Anomaly Detection Performance in Video Surveillance Data," 12th International Conference on Informational Fusion, pp. 694-701 (Jul. 6-9, 2009).

Cremers, et al., "A Review of Statistical Approaches to Level Set Segmentation: Integrating Color, Texture, Motion and Shape," International Journal of Computer Vision, vol. 72, No. 2, pp. 195-215 (2007).

Gipps, P.G. and Marksjö, B., "A Micro-Simulation Model for Pedestrian Flows," Mathematics and Computers in Simulation, vol. 27, No. 2-3, pp. 95-105 (Apr. 1985).

Helbing, D. and Molnar, P. "Social Force Model for Pedestrian Dynamics," Physical Review E, vol. 51, No. 5, pp. 4282-4286 (May 1995).

Helbing, D., "A Fluid-Dynamic Model for the Movement of Pedestrians," Complex Systems, vol. 6, pp. 391-415 (1992).

Henein, C. and White, T., "Agent-based Modelling of Forces in Crowds," Multi-Agent and Multi-Agent-Based Simulation, Lecture Notes in Computer Science, vol. 3415, pp. 173-184 (2005).

Hoogendoorn, S. and Bovy, P.H.L., "Gas-Kinetic Modeling and Simulation of Pedestrian Flows," Transportation Research Record: Journal of the Transportation Research Board, vol. 1710, pp. 28-36 (2000).

International Search Report and Written Opinion Issued by the U.S. Patent and Trademark Office as International Searching Authority for International Application No. PCT/US2012/070149 mailed Feb. 22, 2013 (13 pgs.).

Kerman, et al., "Event Detection Challenges, Methods and Applications in Natural and Artificial Systems," 14th International Command and Control Research and Technology Symposium, 59 pgs. (Mar. 2009).

Kirchner, A. and Schadschneider, A., "Simulation of Evacuation Processes Using a Bionics-Inspired Cellular Automaton Model for Pedestrian Dynamics," Physica A: Statistical Mechanics and its Applications, vol. 312, Nos. 1-2, pp. 260-276 (Sep. 1, 2002).

Kratz, L. and Nishino, K., "Going With the Flow: Pedestrian Efficiency in Crowded Scenes," Lecture Notes in Computer Science, vol. 7575, pp. 558-572 (2012).

Lakoba, et al., "Modifications of the Helbing-Molnar-Farkas-Vicsek Social Force Model for Pedestrian Evolution," Simulation, vol. 81, No. 5, pp. 339-352 (2005).

Law, et al., Computational Modeling of Nonadaptive Crowd Behaviors for Egress Analysis: 2004-2005 CIFE Seed Project Report (Oct. 2005).

Mahadevan, et al., "Anomaly Detection in Crowded Scenes," IEEE Conf. on Computer Vision and Pattern Recognition, pp. 1975-1981 (Jun. 13-18, 2010).

Muramatsu, et al., "Jamming Transition in Pedestrian Counter Flow," Physica A: Statistical Mechanics and its Applications, vol. 267, No. 3-4, pp. 487-498 (1999).

Murphy, K.P., "Machine Learning: a Probabilistic Perspective," The MIT Press, 2012 (Pages).

Nelson, R.C., and Polana R., "Qualitative Recognition of Motion Using Temporal Texture," CVGIP: Image Understanding, vol. 56, No. 1, pp. 78-89 (1992).

Tajima, Y. and Nagatani, T., "Scaling Behavior of Crowd Flow Outside a Hall," Physica A: Statistical Mechanics and its Applications, vol. 292, No. 1-4, pp. 545-554 (Mar. 15, 2001).

Xiong, et al., "Group Anomaly Detection using Flexible Genre Models," Advances in Neural Information Processing Systems 24 (NIPS 2011); Downloaded from http://www.autonlab.org/autonweb/20465/version/2/part/5/data/fgm.pdf?branch=main&language=en on Apr. 17, 2015 (9 pgs.).

\* cited by examiner

US 9,183,512 B2

REAL-TIME ANOMALY DETECTION OF CROWD BEHAVIOR USING MULTI-SENSOR INFORMATION

CROSS-REFERENCE TO RELATED APPLICATIONS

This application is a national stage application of International Patent Application No. PCT/US12/070149, entitled "Real-Time Anomaly Detection of Crowd Behavior Using Multi-Sensor Information," filed Dec. 17, 2012, which claims priority to U.S. Provisional Patent Application No. 61/576,198, entitled "Real-Time Anomaly Detection of Large, Dense Crowd Behavior, from Video and Multi-Sensor Information," filed Dec. 15, 2011, the contents of both of which are expressly incorporated herein by reference in their entirety.

FIELD OF THE DISCLOSURE

The present disclosure relates generally to computer systems for detecting anomalies in crowd behavior and specifically to computer systems for real-time detection of anomalies in crowd motion using multi-sensor information.

BACKGROUND

Crowd behavior can be observed among crowds of many different types of organisms, from humans to animals to cells. Crowd disasters, triggered by real or perceived dangers, are frequent, especially among gatherings of differing numbers of people. For example, over the past ten years, more than three thousand people have died in crowd disasters. Some methods for monitoring crowd behavior include detecting anomalies in crowd behavior, such as individuals avoiding a certain area or people changing directions sharply or even stampeding in response to a real or perceived danger.

Some approaches for detecting anomalies in crowd behavior rely on tracking individuals or virtual particles seeded in the area under observation and driven by the optical flow. Other approaches rely on creating and maintaining a library of normal patterns. These approaches often require high computational complexity and are not suitable for tracking large crowds in substantially real-time.

SUMMARY

In accordance with the disclosed subject matter, methods, systems, and non-transitory computer program products are provided for detecting anomalies in crowd behavior.

Certain embodiments include a method of detecting an anomaly in crowd behavior. The method includes receiving sensor data from one or more sensors, the sensor data representing a crowd in motion, and partitioning the sensor data into a set of local areas, each local area forming a neighborhood for analyzing the crowd in motion. The method further includes, for each local area in the set of local areas, characterizing motion in the local area to determine a set of real-time estimates of motion of sub-populations in the local area based at least in part on the sensor data. Each sub-population can be characterized by a pattern of motion based at least in part on sensor data collected over a longer-term time duration describing motion in the sub-population. The longer-term time duration can include at least one of minutes, hours, days, weeks, seasons, and years. The method further includes providing a crowd model for each local area. Each model can represent dynamics of continuous functions describing expected motion near each local area. The method further includes determining a set of parametric values of the crowd model based at least in part on the real-time estimates of the motion of the sub-populations in the local area, to correlate the set of parametric values with a short-time evolution of the motion of the sub-populations in the local area. The method further includes learning and adapting a set of auxiliary stochastic models based at least in part on evolution of the parametric values of the crowd model over time. The set of auxiliary stochastic models can characterize substantially normal evolution of the parametric values of the crowd model over time associated with each local area. The method further includes identifying an occurrence of a potential anomaly associated with the local area by comparing predictions from an auxiliary stochastic model in the set of auxiliary stochastic models with the set of parametric values of the crowd model based at least in part on the real-time estimates of the motion of the sub-populations in the local area.

Certain embodiments include a system for detecting an anomaly in crowd behavior. The system includes one or more sensors for observing a crowd in motion, storage, and at least one processor. The at least one processor is configured to receive sensor data from the one or more sensors, the sensor data representing the crowd in motion, and partition the sensor data into a set of local areas, each local area forming a neighborhood for analyzing the crowd in motion. For each local area in the set of local areas, the at least one processor is further configured to characterize motion in the local area to determine a set of real-time estimates of motion of sub-populations in the local area based at least in part on the sensor data. Each sub-population can be characterized by a pattern of motion based at least in part on sensor data collected over a longer-term time duration describing motion in the sub-population. The longer-term time duration can include at least one of minutes, hours, days, weeks, seasons, and years. The at least one processor is further configured to provide a crowd model for each local area. Each model can represent dynamics of continuous functions describing expected motion near each local area. The at least one processor is further configured to determine a set of parametric values of the crowd model based at least in part on the real-time estimates of the motion of the sub-populations in the local area, to correlate the set of parametric values with a short-time evolution of the motion of the sub-populations in the local area. The at least one processor is further configured to learn and adapt a set of auxiliary stochastic models based at least in part on evolution of the parametric values of the crowd model over time. The set of auxiliary stochastic models can characterize substantially normal evolution of the parametric values of the crowd model over time associated with each local area. The at least one processor is further configured to identify an occurrence of a potential anomaly associated with the local area by comparing predictions from an auxiliary stochastic model in the set of auxiliary stochastic models with the set of parametric values of the crowd model based at least in part on the real-time estimates of the motion of the sub-populations in the local area.

Certain embodiments include a non-transitory computer program product for detecting an anomaly in crowd behavior. The non-transitory computer program product is tangibly embodied in a computer-readable medium. The non-transitory computer program product includes instructions operable to cause a data processing apparatus to receive sensor data from one or more sensors, the sensor data representing a crowd in motion, and partition the sensor data into a set of local areas. Each local area can form a neighborhood for analyzing the crowd in motion. For each local area in the set of local areas, the non-transitory computer program product further includes instructions operable to cause a data processing apparatus to characterize motion in the local area to determine a set of real-time estimates of motion of sub-populations in the local area based at least in part on the sensor data. Each sub-population can be characterized by a pattern of motion based at least in part on sensor data collected over a longer-term time duration describing motion in the sub-population. The longer-term time duration can include at least one of minutes, hours, days, weeks, seasons, and years. The non-transitory computer program product further includes instructions operable to cause a data processing apparatus to provide a crowd model for each local area. Each model can represent dynamics of continuous functions describing expected motion near each local area. The non-transitory computer program product further includes instructions operable to cause a data processing apparatus to determine a set of parametric values of the crowd model based at least in part on the real-time estimates of the motion of the sub-populations in the local area, to correlate the set of parametric values with a short-time evolution of the motion of the sub-populations in the local area. The non-transitory computer program product further includes instructions operable to cause a data processing apparatus to learn and adapt a set of auxiliary stochastic models based at least in part on evolution of the parametric values of the crowd model over time. The set of auxiliary stochastic models can characterize substantially normal evolution of the parametric values of the crowd model over time associated with each local area. The non-transitory computer program product further includes instructions operable to cause a data processing apparatus to identify an occurrence of a potential anomaly associated with the local area by comparing predictions from an auxiliary stochastic model in the set of auxiliary stochastic models with the set of parametric values of the crowd model based at least in part on the real-time estimates of the motion of the sub-populations in the local area.

The embodiments described herein can include additional aspects of the invention. For example, the embodiments can further include allocating at least one of additional sensor resources and additional computational resources to further analyze motion in the local area associated with the identified potential anomaly to verify whether to flag the identified potential anomaly, if the predictions from the auxiliary stochastic model do not match the set of parametric values of the crowd model based at least in part on the real-time estimates of the motion of the sub-populations in the local area; and wherein if the further analysis of the motion in the local area associated with the identified potential anomaly determines that the identified potential anomaly should be flagged, analyzing motion of one or more individuals in the local area to verify whether the identified potential anomaly is an actual anomaly. The sensor data can include data from a video stream; the partitioning the sensor data can include associating a subset of the sensor data with each local area in the set of local areas, each local area forming a neighborhood around a grid point in a spatial grid of the video stream representing an area under observation; the set of real-time estimates of the motion of the sub-populations can include real-time estimates of a velocity field and a density field; the crowd model can be based at least in part on continuous-state, multi-population, compressible fluid dynamics to model expected motion near each local area, and wherein parameters of the crowd model include coefficients for quantifying an effect of crowd viscosity, crowd pressure, extraneous forces, and random motion that characterize local motion of each sub-population in the local area: the learning and adapting the set of auxiliary stochastic models can include determining a set of thresholds that represent substantially normal values of at least one of (i) the continuous functions describing expected motion near each local area, (ii) the parametric values of the crowd model, (iii) the coefficients of any auxiliary stochastic model in the set of auxiliary stochastic models, and (iv) spatial and temporal derivatives of at least one of (i), (ii), and (iii), for each local area, the set of thresholds being determined based at least in part on at least one of sensor data collected over the longer-term time duration and the real-time estimates of the motion of the sub-populations; and the identifying the occurrence of the potential anomaly associated with the local area can include at least one of (i) determining whether a residual error identified by any of the auxiliary stochastic models in the set of auxiliary stochastic models exceeds a pre-determined threshold in the set of thresholds, and (ii) determining whether a residual error identified by the crowd model exceeds the pre-determined threshold. The embodiments can further include aggregating parametric values from the crowd model and predictions from the set of auxiliary stochastic models for a plurality of local areas, and identifying an occurrence of a potential anomaly associated with the crowd, by comparing the aggregated predictions from the set of auxiliary stochastic models and the parametric values from the crowd model based at least in part on the real-time estimates of the crowd in motion for the plurality of local areas. The parametric values of the crowd model based at least in part on the real-time estimates of the motion of the sub-populations in the local area can be determined based at least in part on at least one of minimum variance unbiased estimation, maximum likelihood estimation, least squares estimation, minimum mean-square estimation, maximum a posteriori estimation, optimal filtering, Wiener filtering, and Kalman filtering. The auxiliary stochastic models can be learned based at least in part on at least one of principal components analysis, linear discriminant analysis, subspace learning, Galerkin methods, Hankel matrix-based methods, and machine learning algorithms. At least one of the motion in the local area and the motion of the individuals in the local area can be analyzed based at least in part on agent-based crowd models with socio-economic forces, Boltzmann-like gas-kinetic models for crowd motion, lattice gas models for crowd motion, and cellular automata for crowd motion.

BRIEF DESCRIPTION OF THE DRAWINGS

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

DETAILED DESCRIPTION

Figure 1:
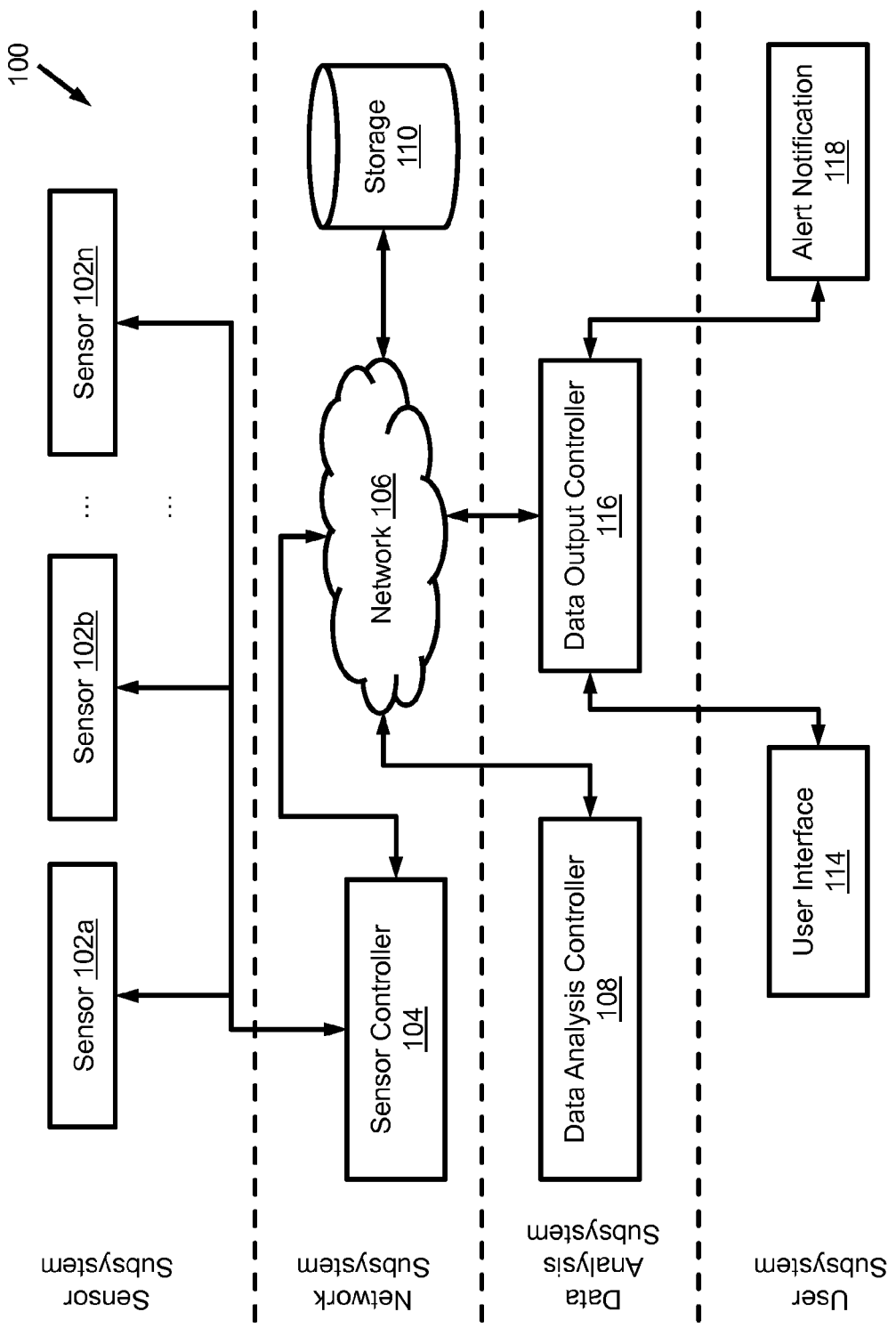
FIG. 1 illustrates a non-limiting example of a system for detecting anomalies in crowd behavior in accordance with some embodiments of the present disclosure.

In general, the present disclosure relates to a system and method for detecting anomalies in crowd behavior. For example, the present system receives sensor data from one or more sensors representing a crowd in motion. In some embodiments, the sensor data can be a video stream of the crowd. The present system partitions the sensor data into a set of local areas. In some embodiments, the present system partitions the sensor data by associating a subset of the sensor data with each local area, using a pre-defined spatial grid in the physical domain over frames in the video stream, each local area forming a neighborhood around each grid point in the spatial grid representing an area under observation.

For each local area in the set of local areas, the present system performs the following. Based on the sensor data, the present system characterizes the motion in each local area to determine a set of real-time estimates of motion of the sub-populations found in each local area. Each sub-population can be characterized by a pattern of motion based at least in part on sensor data collected over a long time duration describing motion in the sub-population. For example, each sub-population can be represented by a characteristic motion pattern such as route and velocity. One sub-population may represent people in a crowd who settle into lanes of "crowd traffic" headed left down a sidewalk, and another sub-population may represent people headed right. In some embodiments, the real-time estimates of the motion can include real-time estimates of a velocity and a density of each sub-population near the local area, at each grid point. The present system provides a dynamic crowd model for each local area, where each model represents dynamics of a continuous function describing expected motion near the local area. In some embodiments, the crowd model can be based on continuous-state, multi-population, compressible fluid dynamics to model expected motion near each local area. Example state can include the velocity and the density of each sub-population near the local area. The crowd model includes a set of parameters. Example parameters can include coefficients of the crowd model quantifying the effect of crowd viscosity, crowd pressure, extraneous forces, and random motion that characterize local motion of each sub-population. The present system then determines values for the parameters in the crowd model, based on the real-time estimates of the motion of the sub-populations in the local area, to correlate the parametric values with a short-time evolution of the motion of the sub-populations found in the local area. For example, the present system determines real-time estimates of the parametric values of the crowd model based on the real-time estimates of the velocity and the density from the characterized motion in the local area.

The present system uses the real-time parametric values of the crowd model to learn and adapt a set of auxiliary stochastic models. The auxiliary stochastic models characterize substantially normal evolution over time of the parametric values of the crowd model associated with each local area based on the real-time estimates of the velocity and the density of the local area. The evolution over time of the parametric values of the crowd model identified by the auxiliary stochastic models represents substantially normal motion in each local area.

The present system then identifies an occurrence of a potential anomaly associated with the local area, by comparing predictions from the set of auxiliary stochastic models with the set of parametric values of the crowd model. For example, the present system determines when the difference between predictions by each local auxiliary stochastic model and the real-time estimates of parametric values of the crowd model exceed pre-determined thresholds. If the difference between predictions exceeds the pre-determined thresholds, the present system identifies a potential anomaly. In some embodiments, comparing predictions from the set of auxiliary stochastic models with the set of parametric values from the crowd model includes determining whether local crowd densities or velocities exceed pre-determined normal levels in a corresponding local area, or determining whether sharp spatial variations of real-time estimates of parametric values of the crowd model or of coefficients of the set of auxiliary stochastic models in a local area exceed pre-determined thresholds. If any threshold is exceeded, the present system identifies a potential anomaly in the respective local area.

In further embodiments, in response to identifying a potential anomaly, the present system allocates additional sensor resources to further analyze motion in the local area associated with the identified anomaly, to verify whether to flag the identified anomaly. If the further analysis of the motion in the local area determines that the identified anomaly should be flagged, the present system allocates still further sensor resources to analyze motion of one or more individuals in the sub-population, to verify whether the identified anomaly is an actual anomaly.

Turning to the figures, FIG. 1 illustrates a non-limiting example of a system 100 for detecting anomalies in crowd behavior in accordance with some embodiments of the present disclosure. System 100 receives sensor data representing crowd behavior from sensors 102*a-n*, and outputs an alert of an anomaly via user interface 114 and/or alert notification 118 through data analysis controller 108. Data analysis controller 108 uses sensor controller 104, network 106, and storage 110 to process the received sensor data to detect anomalies in crowd behavior.

Sensors 102*a-n* can include a number of spatially distributed sensing devices. The sensing devices include a known position and a known sensed area available to system 100. Non-limiting examples of sensors 102*a-n* can include optical or infrared video cameras, radar systems, photoelectric sensors, pressure-sensitive sensors, wireless non-contact systems, acoustic sensors such as microphones, optical sensors, laser-based systems, or systems employing localization of mobile phones such as in observing crowds of people. Example wireless non-contact systems can include systems using radio-frequency electromagnetic fields, such as Radio Frequency Identification (RFID) systems or Near-Field Communication (NFC) systems. Laser-based systems are presented by Fod, Howard, and Mataric (Fod, A., Howard, A. and Mataric, M. A. J., "A laser-based people tracker," Robotics and Automation, 2002, Proceedings, ICRA '02, IEEE International Conference on, vol. 3. IEEE, 2002, the entire contents of which are incorporated by reference herein). Systems for localization of mobile phones are presented by Mori et al. (Mori, T. et al., "Multiple people tracking by integrating distributed floor pressure sensors and RFID system," Systems, Man and Cybernetics, 2004 IEEE International Conference on, Vol. 6, IEEE, 2004, the entire contents of which are incorporated by reference herein).

In some embodiments, sensors 102a-n may allow system 100 to control the sensing device's orientation. For example, system 100 may control sensors 102a-n to zoom, pan, tilt, rotate, or otherwise alter the sensor device's orientation using sensor controller 104.

In some embodiments, sensors 102a-n may use raw sensor data such as analog data including raw video streams or radar data. Sensors 102a-n may further pre-process the raw sensor data. For example, sensors 102a-n may perform video encoding on raw video data, declutter raw radar data, extract velocity and/or density information from raw radar data or video data, or perform other similar pre-processing operations on raw sensor data. In further embodiments, video camera sensors may include analog or digital cameras operating in accordance with various video standards. For example, video data may be output according to the National Television System Committee (NTSC) or Phase Alternating Line (PAL) standard. The video data may include further encoding, such as digital encoding according to the Motion Picture Expert Group (MPEG) standard, or according to digital codecs including H.263 or H.264. Alternatively, as described earlier, the video sensor data may include simply the raw video stream.

As described earlier, sensor controller 104 acts as a gateway between sensors 102a-n and the rest of system 100. Sensor controller 104 forwards data from sensors 102a-n to data analysis controller 108 and data storage 110. Sensor controller 104 also receives and processes commands to allow system 100 to monitor or control sensors 102a-n.

Network 106 transfers data by connecting sensor controller 102 and data storage 110 with data analysis controller 108. The signals used by system 100 can be transmitted over a computer network (such as point-to-point networks, Local Area Networks (LAN) and/or Wide Area Networks (WAN), etc.), broadband telecommunications signaling systems (such as Digital Subscriber Line (DSL), Integrated Services Digital Network (ISDN), frame relay networks, cell relay networks, etc.), wireless links (802.11 wireless LAN, Bluetooth, etc.), and so on. Network 106 connects the components illustrated in FIG. 1 and allows mutual communication among components. In some embodiments, system 100 may use encryption methods for data transport. A non-limiting example encryption method includes trusted public-key cryptography. Although FIG. 1 illustrates sensor controller 104 connected to data analysis controller 108 via network 106, in some embodiments sensor controller subsystem 104 may be connected directly to data analysis controller 108.

Data analysis controller 108 processes sensor data from sensors 102a-n to detect anomalies in crowd behavior. Data analysis controller 108 is described in further detail in connection with FIGS. 2-4 and 8-9.

Storage 110 may include centralized or decentralized storage for storing data generated by system 100. Non-limiting examples of stored data may include the sensed data (or parts thereof) provided by sensors 102a-n and sensor controller 104 via data analysis controller 108, or intermediate and/or final results generated by data analysis controller 108, user interface 114, data output controller 116, and/or alert notification 118. Example storage may include Network-Attached Storage (NAS). Storage Area Network (SAN) solutions. Redundant Arrays of Inexpensive Disks (RAID), hard disks, flash memory devices, Digital Video Recorders (DVRs), or other storage for storing data generated by system 100.

Data output controller 116 receives output from data analysis controller 108 to display results and/or notify human operators or users of detected anomalies using user interface 114 and alert notification 118. Data output controller 116 processes intermediate and/or final results from data analysis controller 108 to determine whether output should be displayed on user interface 114 or whether an operator should be alerted via alert notification 118. In some embodiments, data output controller 116 can allow a user to manage and configure system 100 using user interface 114. Data output controller 116 can also notify a human operator of detected anomalies via alert notification 118 using acoustic, audio, or visual alarms to report a detected anomaly and/or present or detail the result of the anomaly detection. Non-limiting examples of alert notification 118 can include visual display units, loudspeakers, or warning lights.

User interface 114 may include an arbitrary number of textual and/or visual interfaces to system 100. User interface 114 may include a client interface application to display the state of system 100, (for example, graphical representations of output from sensors 102a-n, intermediate and/or final results from data analysis controller 108), and may provide user controls for a user to interact with and/or manage system 100, as described in further detail later. User interface 114 can communicate over network 106 with sensors 102a-n directly or via sensor controller 104, data analysis controller 108, and storage 110. User interface 114 may be implemented on local or remote, stationary or mobile devices including personal computers, mobile phones, smart phones, or personal telecommunications devices for short messages such as pagers.

Alert notification 118 may alert a human operator or user in case of a detected anomaly. For example, in response to detecting an anomaly in crowd behavior, alert notification 118 may release an acoustic, audio, or visual alarm and execute a set of pre-defined rules. Non-limiting examples of pre-defined rules may include notifying a closed-circuit television (CCTV) operator or notifying security and/or law-enforcement personnel. In some embodiments, in contrast to user interface 114, alert notification 118 can further provide an always-on capability. In this instance, new system messages such as alert messages and status updates can be actively transferred as they arrive, for example from data analysis controller 108 to the alert notification 118.

System 100 can be implemented as electronic hardware, computer software, or combinations of both. For example, system 100 may be implemented on any kind of single or multiple desktop- or server-class computer system, or any microprocessor-based device or devices. To illustrate this interchangeability of hardware and software, various illustrative blocks, modules, elements, and components have been described generally in terms of their functionality. Whether such functionality is implemented as hardware, software, or a combination depends upon the particular application and design constraints imposed on the overall system. Skilled artisans can implement the described functionality in varying ways for each particular application. Furthermore, various components and blocks can be arranged differently (for example, arranged in a different order, or partitioned in a different way) all without departing from the scope of system 100. For example, sensor controller 104, data analysis controller 108, and data output 116 may be incorporated in system 100 through hardware modules, software modules, or combinations of both.

Figure 2:
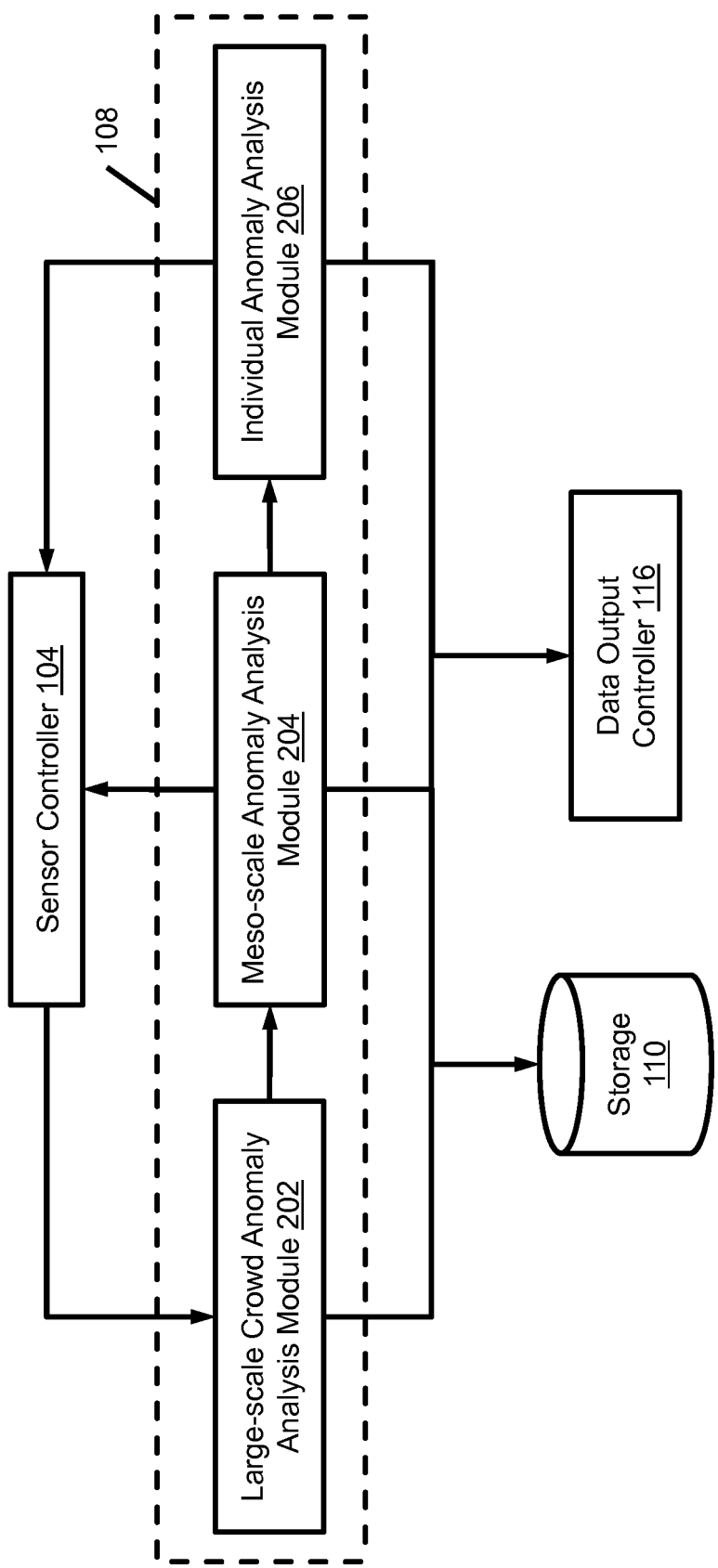
FIG. 2 illustrates a non-limiting example of a data analysis controller for detecting anomalies in crowd behavior in accordance with certain embodiments of the present disclosure.

FIG. 2 illustrates a non-limiting example of a data analysis controller 108 for detecting anomalies in crowd behavior in accordance with certain embodiments of the present disclosure. As described earlier, data analysis controller 108 receives sensor data, processes the sensor data, and sends intermediate and/or final results to data output controller 116 for display or notification via the user interface and the alert notification. FIG. 2 illustrates data analysis controller 108 in communication with sensor controller 104, storage 110, and data output controller 116. Also described earlier, the modules may communicate via direct connection, or via an indirect connection such as a network.

In some embodiments, data analysis controller 108 processes received sensor data at the crowd level, local area level, and individual level. Large-scale crowd anomaly analysis module 202 receives sensor data from sensor controller 104 and processes the received sensor data at the crowd level. Large-scale crowd anomaly analysis module 202 is described in further detail in connection with FIGS. 3 and 4.

After the present system identifies a potential anomaly in a local area at the large-scale crowd level, the present system focuses additional sensor resources or computational resources to verify the potential anomaly at the local area scale, and further at the individual scale. As used herein, the term "meso-scale" refers to analysis of anomalies concentrated or focused on the local area level. Meso-scale anomaly analysis module 204 sends commands to sensor controller 104 to allocate sensor resources, and processes resulting received sensor data on local areas of interest. In some embodiments, the local area scale represents a neighborhood partitioned by the present system. For example, a local area can represent a neighborhood around a pre-determined grid point of a spatial grid partitioning a video stream, and the neighborhood can contain multiple sub-populations.

Meso-scale anomaly analysis module 204 verifies an identified potential anomaly at the local area scale as follows. Meso-scale anomaly analysis module 204 sends commands to sensor controller 104 to concentrate additional resources such as sensor resources and computing resources on a local area associated with an identified potential anomaly. A local area of interest represents a suspicious area for further analysis, because the large-scale crowd model has identified a potential anomaly for review.

In some embodiments, meso-scale anomaly analysis module 204 can process the additional received sensor data using agent-based crowd models with socio-economic forces, Boltzmann-like gas-kinetic models for crowd motion, lattice gas models for crowd motion, or cellular automata for crowd motion. Agent-based crowd models with socio-economic forces are presented by Gipps and Marksjö, Helbing and Molnar, Henein and White, and Lakoba, Kaup, and Finkelstein (Gipps, P. G. and Marksjö, B., "*A micro-simulation model for pedestrian flows*," Mathematics and Computers in Simulation 27.2 (1985): pp. 95-105; Helbing, D. and Molnar, P. "*Social force model for pedestrian dynamics*," Physical review E 51.5 (1995): p. 4282; Henein, C. and White, T., "*Agent-based modelling of forces in crowds*," Multi-agent and multi-agent-based simulation (2005): pp. 173-184; and Lakoba, T. I., Kaup, D. J. and Finkelstein, N. M., "*Modifications of the Helbing-Molnar-Farkas-Vicsek social force model for pedestrian evolution*," Simulation 81.5 (2005): pp. 339-352, the entire contents of all of which are incorporated by reference herein). Boltzmann-like gas-kinetic models are presented by Helbing, and Hoogendoorn and Bovy (Helbing, D., "*A Fluid-Dynamic Model for the Movement of Pedestrians*," Complex Systems 6 (1992): pp. 391-415: Hoogendoorn, S. and Bovy, P. H. L., "*Gas-kinetic modeling and simulation of pedestrian flows*," Transportation Research Record Journal of the Transportation Research Board 1710.-1, (2000): pp. 28-36, the entire contents of both of which are incorporated by reference herein). Lattice gas models for crowd motion are presented by Muramatsu, Irie, and Nagatani, and Tajima and Nagatani (Muramatsu, M., Irie, T. and Nagatani, T., "*Jamming transition in pedestrian counter flow*," Physica A: Statistical Mechanics and its Applications 267.3 (1999): pp. 487-498; Tajima. Y. and Nagatani, T., "*Scaling behavior of crowd flow outside a hall*," Physica A: Statistical Mechanics and its Applications 292.1 (2001): pp. 545-554). Cellular automata for crowd motion are presented by Kirchner and Schadschneider (Kirchner. A. and Schadschneider, A., "*Simulation of evacuation processes using a bionics-inspired cellular automaton model for pedestrian dynamics*," Physica A: Statistical Mechanics and its Applications 312.1 (2002): pp. 260-276).

After verifying an identified potential anomaly at the local area scale, individual anomaly analysis module 206 sends commands to sensor controller 104 to allocate additional sensor resources and further processes received additional sensor data at the individual level. Similar to meso-scale anomaly analysis module 204, individual anomaly analysis module 206 sends further commands to sensor controller 104 to concentrate additional resources such as sensor resources, computing resources, or human resources on individuals in the sub-population or local area associated with an identified potential anomaly. In some embodiments, individual anomaly analysis module 206 can process the additional received sensor data using the agent-based crowd models with socio-economic forces described earlier, presented by Gipps and Marksjö, Helbing and Molnar. Henein and White, and Lakoba, Kaup, and Finkelstein.

Figure 3:
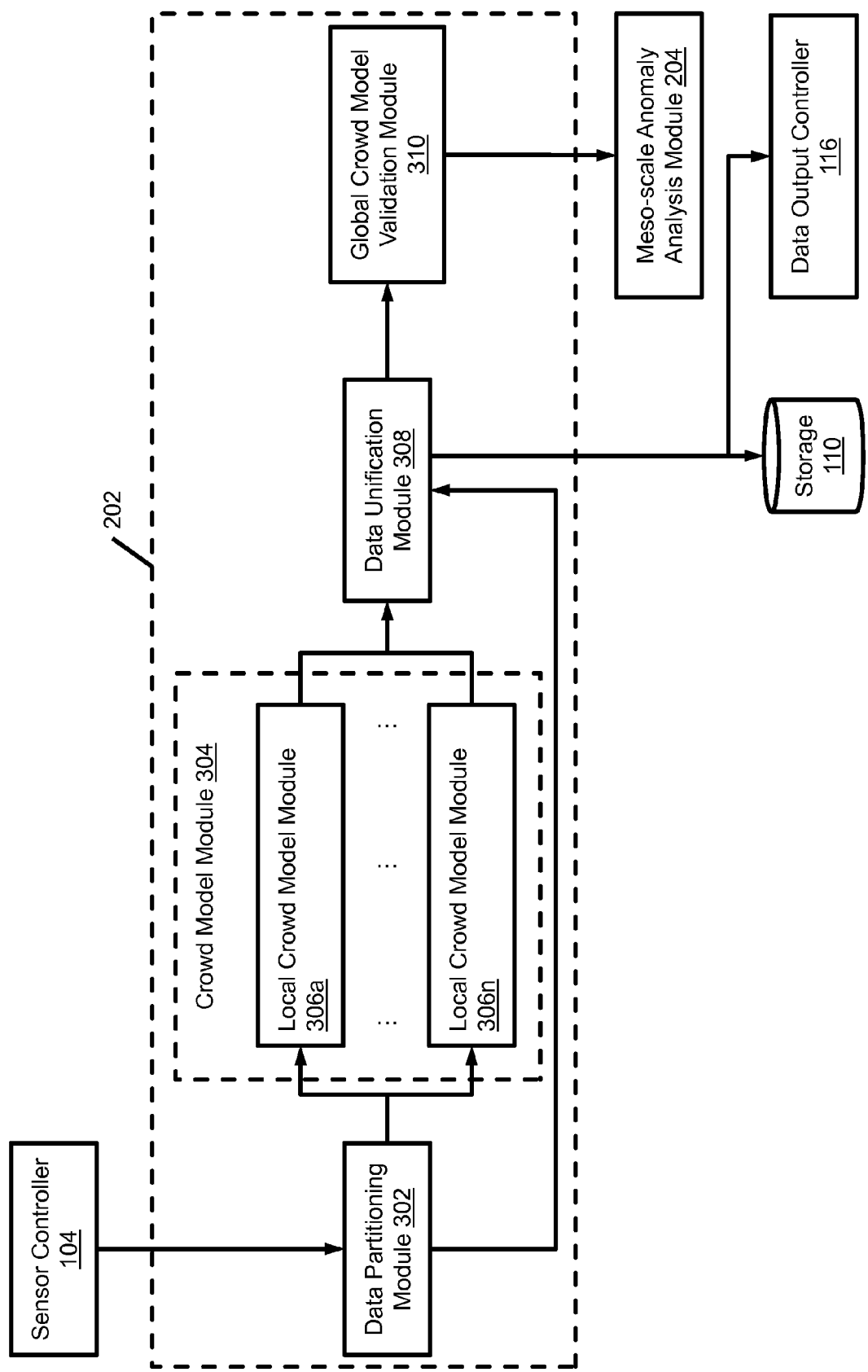
FIG. 3 illustrates a non-limiting example of a large-scale crowd analysis module for detecting anomalies in crowd behavior in accordance with certain embodiments of the present disclosure.

FIG. 3 illustrates a non-limiting example of a large-scale crowd analysis module 202 for detecting anomalies in crowd behavior in accordance with certain embodiments of the present disclosure. Large-scale crowd anomaly analysis module 202 includes a data partitioning module 302, a crowd model module 304, a data unification module 308, and a crowd model validation module 310.

Data partitioning module 302 partitions sensor data received from sensor controller 104 into pertinent data pertinent to small, possibly overlapping local areas or volumes. As used herein, the term "volume" refers to a bounded space in the three-dimensional world if the present system is being used with sensor data representing a crowd in motion in three dimensions. As used herein, the term "sub-area" refers to a local area, neighborhood, or bounded set of locations in the crowd. In some embodiments, the present system partitions sensor data representing the crowd spatially into a grid. The partitions defined around each grid point can represent local areas, or sub-areas in the sensor data. Agents, such as individuals or groups of humans, in each local area can move from one local area to another, although the partitioned local areas themselves remain stationary. Data partitioning module 302 scales the size of the localized sub-area by the spatial resolution of the sensed data. As described later in connection with FIG. 7, the size of the local area can be based on the spatial resolution available from the sensed data. For example, the size of the local area can depend on the spatial resolution needed to estimate a density of the corresponding sub-population in the crowd. That is, a minimum value for the size of the local area can be given by the smallest area needed to estimate reliably a density and/or a velocity of a sub-population. The velocity field and density field estimation performed by the present system are described in further detail later, in connection with FIG. 7. In further embodiments, the size of the local area can depend on the number of parameters used in the crowd model of the corresponding sub-population.

Crowd model module 304 detects anomalies in crowd behavior based on real-time parametric values in a crowd model and evolution or variations in the parametric values based on an auxiliary stochastic model. As used herein, the term "local crowd model" refers to an analysis of a crowd model associated with a corresponding local area. For each local area defined by data partition module 301, crowd model module 304 uses a local crowd model module 306a-n to monitor crowd behavior and to detect anomalies from normal behavior. The output of local crowd modules 306a-n includes an assessment of anomalies in each local area. In some embodiments, the output can be determined as either as a boolean value (true or false), a binary value (0 or 1, where 0 denotes "no anomaly found" and 1 denotes "potential anomaly found"), or an analog or discretized value field, (such as a range between 0 and 1). In further embodiments, local crowd modules 306a-n can return intermediate values such as both the estimated velocity and density for the corresponding local area, or the parametric values determined in the crowd model, for use in global comparisons of multiple local areas.

Data unification module 308 performs a spatial union of the output from crowd model module 304. That is, data unification module 308 represents an inverse operation to data partitioning module 304. An example of a spatial union may include determining a weighted average of the output from local crowd model modules 306a-n. In some embodiments, the weighted averaging may include statistical, spatial, and/or temporal averages of the crowd model output.

Crowd model validation module 310 validates or invalidates the real-time parametric values of the crowd model used by crowd model module 304 and local crowd model modules 306a-n, based on aggregated crowd behavior data from data unification module 308. For example, crowd model validation module 310 may validate or invalidate the crowd model used by crowd model module 304 using a set of pre-defined heuristic rules describing anomalies, to determine how well the crowd model performs. Example pre-defined anomalies may include heavy motion in a particular direction, strong rotational motion, high crowd density, shock waves, etc. If crowd model validation module 310 invalidates the real-time, sensor-data-driven parametric value estimates and/or estimated states of the crowd model, this identifies a potential anomaly for further analysis or attention. Non-limiting example states of the crowd model can include a velocity and density for each sub-population being analyzed.

Figure 4:
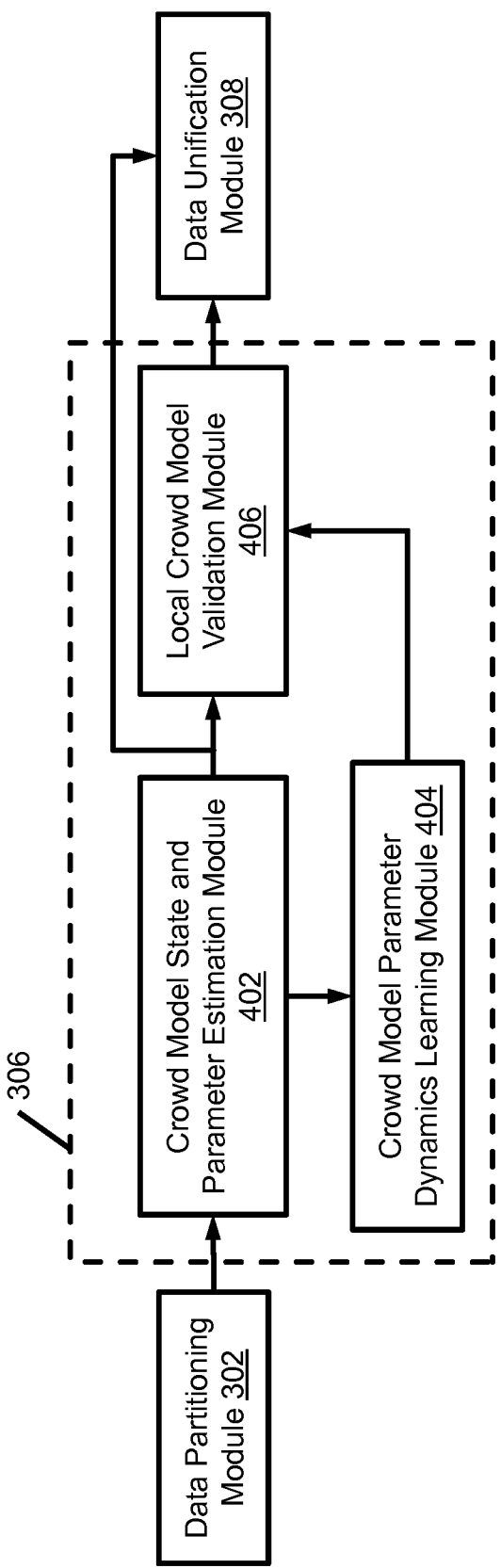
FIG. 4 illustrates a non-limiting example of a local crowd model module for detecting anomalies in crowd behavior in accordance with certain embodiments of the present disclosure.

FIG. 4 illustrates a non-limiting example of a local crowd model module 306 for detecting anomalies in crowd behavior in accordance with certain embodiments of the present disclosure. Local crowd model module 306 includes a crowd model state and parameter estimation module 402, a crowd module parameter dynamics learning module 404, and a local crowd model validation module 406. Local crowd model module 306 receives partitioned local area information from data partitioning module 302, processes the local area information based on the local crowd module, and sends intermediate and/or final results to data unification module 308.

Crowd model state and parameter estimator module 402 estimates the sensor-data-driven state and parametric values of the local crowd model in substantially real-time. Substantially real-time can include anomaly detection within a short latency, such as on the order of seconds, or within seconds or minutes of receiving the corresponding sensor data from sensor controller 104. Example estimated state can include a velocity field and a density field of the local area. Velocity fields and density fields are described in further detail in connection with FIG. 7.

Example estimated parameters can include coefficients of a crowd model quantifying the effect of the following factors: crowd viscosity, crowd pressure, extraneous forces, and random motion. The present disclosure describes a family or set of continuous functions including a compressible, multi-population, fluid-like dynamic model representing crowd behavior such as crowd motion. In fluid dynamics, compressibility refers to fluids in which fluid density varies in response to a change in pressure. Velocity field estimation, density field estimation, and parametric variation in the crowd model are described in further detail in connection with FIG. 7. Further background in fluid dynamics is presented by Batchelor, Ferziger and Perić, and Srinivas and Fletcher (Batchelor. G. K., "*An introduction to fluid dynamics*." Cambridge University Press, UK, 2000; Ferziger, J. H. and Perić, M., "*Computational methods for fluid dynamics*," vol. 2., Springer Berlin, 1999; and Srinivas, K. and Fletcher, J. C. A., "*Computational techniques for fluid dynamics: a solutions manual*," Springer, 1992; the entire contents of all of which are incorporated by reference herein).

Crowd model parameter dynamics learning module 404 learns the dynamic system of functions in the crowd model and evolution over time of the real-time parametric values therein. Crowd model parameter dynamics learning module 404 learns the evolution of, or variations in, the parametric values which are estimated in crowd model state and parameter estimation module 402. A set of low-order auxiliary stochastic models describes the dynamics of temporal variations in values of parameters or coefficients of the crowd model. The present system continually updates these auxiliary stochastic models using long-term observations during operation, and learns these auxiliary stochastic models during an initial training period. The auxiliary stochastic models can predict parametric values of coefficients in the crowd model, as well as predicting higher-order statistics describing expected variations in the parametric values such as expected covariance, variance, or standard deviation of a parametric value. Non-limiting example learning methods include system identification methods, as described in further detail later in connection with FIG. 7.

Local crowd model validation module 406 validates the crowd model for the local area using the estimated state and parametric values generated by crowd model state and parameter estimation module 402 and the auxiliary stochastic models learned by crowd model parameter dynamics learning module 404. The parametric values in the crowd model can vary and evolve dynamically over time and space. The present process uses auxiliary low-order stochastic models and tolerances which governs the dynamics of temporal variations in parametric values of the crowd model coefficients which are determined to be expected, typical, or normal. The present process learns these auxiliary stochastic models during an initial training period, and continually updates or adapts the auxiliary stochastic models during operation of the present system. As described later in connection with FIG. 7, non-limiting example learning methods include methods based on principal components analysis (PCA), linear discriminant analysis (LDA), subspace learning (such as local linear embedding), Galerkin methods, Hankel matrix-based methods, and machine learning algorithms (such as support vector machines, Bayesian networks, or evolutionary algorithms). Principal components analysis is presented by Tenenbaum, De Silva, and Langford (Tenenbaum, J. B., De Silva, V. and Langford, J. C., "*A global geometric framework for nonlinear dimensionality reduction*," Science 290.5500 (2000): pp 2319-2323, the entire contents of which are incorporated by reference herein). Linear discriminant analysis is presented by Roth and Steinhage (Roth. V. and Steinhage. V., "*Nonlinear discriminant analysis using kernel functions*," Sekretariat für Forschungsberichte, Inst. für Informatik III, 1999, the entire contents of which are incorporated by reference herein). Subspace learning and local linear embedding is presented by Roweis and Saul (Roweis. S. T. and Saul, L. K., "*Nonlinear dimensionality reduction by locally linear embedding*," Science 290.5500 (2000): pp. 2323-2326, the entire contents of which are incorporated by reference herein). Galerkin methods are presented by Holmes, and Rowley, Colonius, and Murray (Holmes, P. J., et al. "*Low-dimensional models of coherent structures in turbulence*." Physics Reports 287.4 (1997): pp. 337-384; Rowley, C. W., Colonius, T. and Murray, R. M., "*Model reduction for compressible flows using POD and Galerkin projection*," Physica D: Nonlinear Phenomena 189.1 (2004): pp. 115-129, the entire contents of both of which are incorporated by reference herein). Machine-learning is presented by Bishop and Murphy (Bishop, C. M., "*Pattern recognition and machine learning*," Vol. 4. No. 4., Springer, New York, 2006; Murphy, K. P., "*Machine Learning: a Probabilistic Perspective*," The MIT Press, 2012, the entire contents of both of which are incorporated by reference herein).

An identified anomaly in crowd behavior is determined based on a change in the parametric values of coefficients of the crowd model in a certain local area of the crowd, where the crowd model is based on fluid dynamics. An anomaly is considered to be a change that invalidates the predictions of the previously learned auxiliary stochastic models and tolerances from crowd model parameter dynamics learning module 404. Specifically, a parametric value that exceeds pre-determined tolerances or a pre-determined threshold for evolution over time of the parameters of the crowd behavior model can be identified as a potential anomaly. The evolution over time of the parametric values can be learned by the low-order auxiliary stochastic model. In some embodiments, the present system can identify a potential anomaly using mismatches of the sensor-data-driven state, or estimates of parametric values from the crowd model, or from the auxiliary stochastic model. As used herein, "data-driven state" refers to state that is determinable directly or indirectly from the sensor data, such as the real-time estimates of the velocity and density determined by characterizing motion in the local area, complexity measures, or first- or higher-order (spatial or temporal) derivatives of velocity or density.

Figure 5:
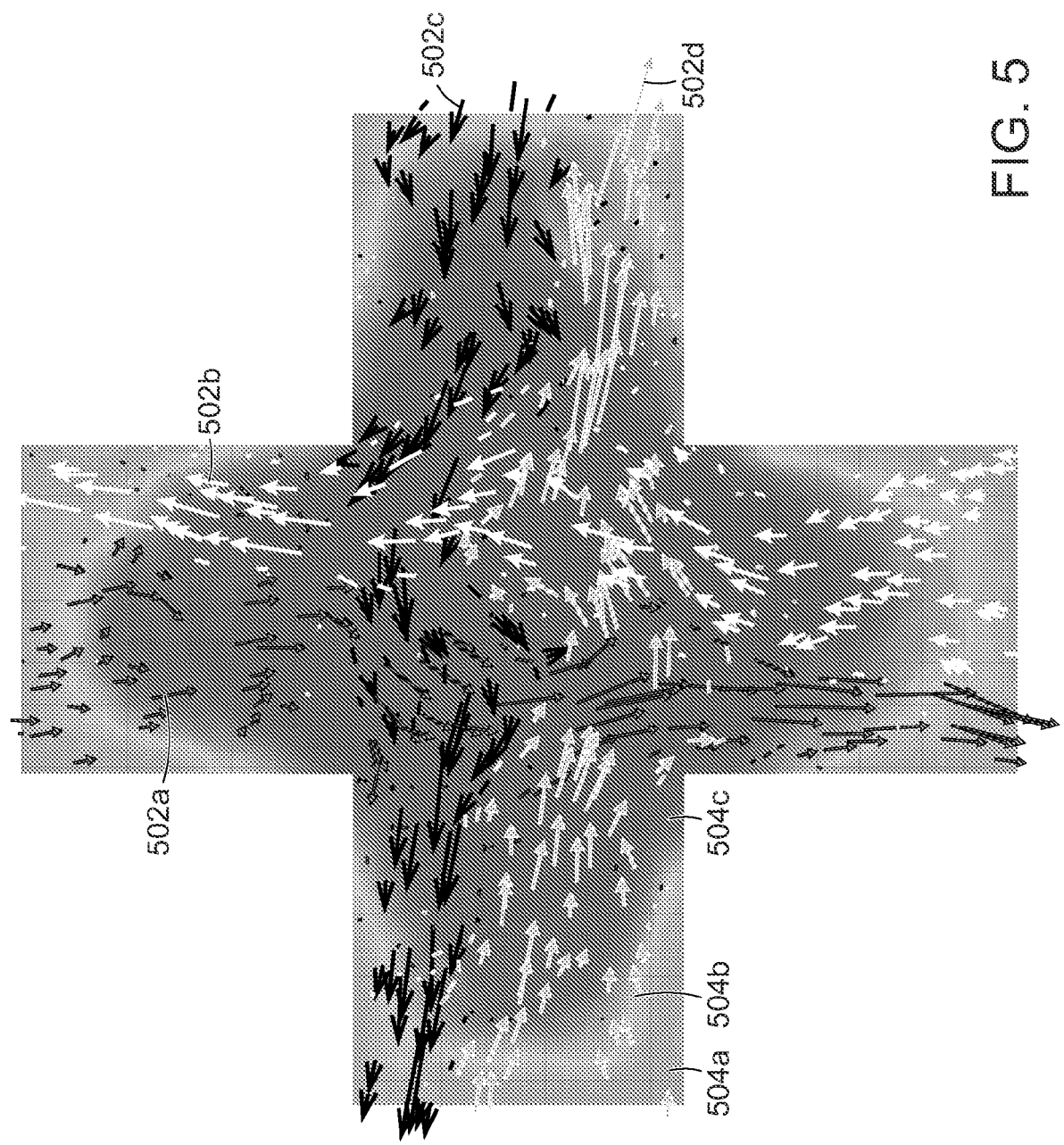
FIG. 5 illustrates a non-limiting example of a velocity field and a density field based on a crowd model for determining anomalies in crowd behavior in accordance with certain embodiments of the present disclosure.

FIG. 5 illustrates a non-limiting illustrative example of a velocity field and a density field based on a crowd model for determining anomalies in crowd behavior in accordance with certain embodiments of the present disclosure. The crowd model associated with FIG. 5 will be discussed in further detail in connection with FIG. 7. Velocity vectors 502*a-d* are illustrated by arrows in light gray, white, black, and dark gray shades. Velocity vectors 502*a-d* illustrate velocity vectors of four sub-populations characterized by motion from (1) the top opening to the bottom opening, (2) bottom opening to the top opening, (3) right opening to the left opening, and (4) left opening to the right opening. The length of the arrows indicates the local speed of the corresponding sub-population. Color 504*a-c* represents an aggregated local density of all sub-populations, from low (medium gray, 504*a*) through medium (light gray, 504*b*) and high (dark gray, 504*c*).

Figure 6:
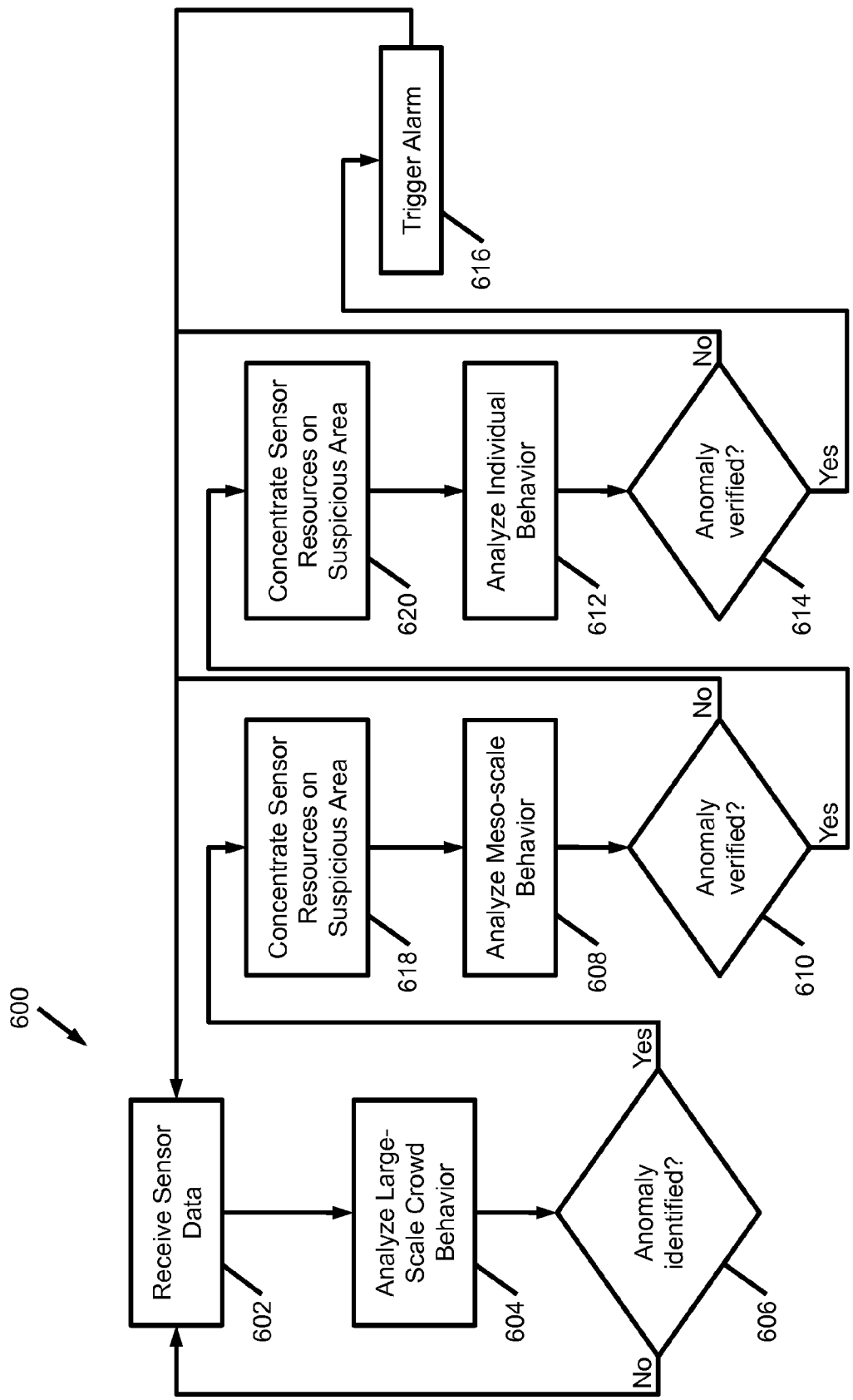
FIG. 6 illustrates a non-limiting example of a process that the system performs for detecting anomalies in crowd behavior in accordance with certain embodiments of the present disclosure.

FIG. 6 illustrates a non-limiting example of a process 600 that the system performs for detecting anomalies in crowd behavior in accordance with certain embodiments of the present disclosure. First, the present system receives sensor data from the spatially distributed sensor devices (step 602). The present system proceeds to analyze large-scale crowd behavior based on the received sensor data to determine if a potential anomaly is identified in the sensed area (step 604). The analysis of large-scale crowd behavior is described in further detail later in connection with FIG. 7.

If a potential anomaly is not identified (step 606: No), the present system continues to process the next incoming sensor data. If a potential anomaly is identified (step 606: Yes), the present system may concentrate sensor and/or computational resources on the suspicious local area or on the abnormally-behaving sub-population associated with the suspicious local area (step 618), to prioritize verification of an identified potential anomaly. The present system analyzes sub-population behavior or motion in the suspicious local area to verify the identified potential anomaly (step 608). A non-limiting example of analysis of sub-population behavior includes methods based on tracking individuals or particle motion.

If the present system does not verify the identified potential anomaly in the suspicious local area (step 610: No), the present system returns to process the next incoming sensor data. If the present system verifies the identified potential anomaly in the local area (step 610: Yes), the present system proceeds to concentrate further sensor resources on the sub-population or on the suspicious local area to prioritize verification of an identified potential anomaly (step 620). For example, the present system may concentrate resources, including sensor, computational, or human resources, to prioritize detection of an anomaly in crowd behavior. The present system may verify an identified potential anomaly using agent-based crowd models with socio-economic forces, Boltzmann-like gas-kinetic models for crowd motion, lattice gas models for crowd motion, or cellular automata for crowd motion, as described earlier in connection with FIG. 2. The present system proceeds to analyze the local area associated with the identified potential anomaly at an individual level (step 612). Similar to methods described in connection with step 608, the present system may follow individuals involved in an identified potential anomaly.

If the identified potential anomaly is verified (step 614: Yes), the present process proceeds to trigger an alarm (step 616). In some embodiments, the alarm can be triggered following various steps illustrated in FIG. 6. For example, the alarm can be triggered following the anomaly analysis on the large-scale crowd level (step 606: Yes), meso-scale level (step 610: Yes), and/or individual level (step 614: Yes).

In further embodiments, the triggering of the alarm may include executing a set of user-defined rules. Example user-defined rules may include notifying a closed-circuit television (CCTV) operator, security and/or law-enforcement personnel, or sending data related to the triggering of the alarm to the storage, etc. If the identified potential anomaly is not verified (step 614: No), the present process processes further sensor data.

In some embodiments, the present process further includes sending intermediate results of various steps to the user subsystem, such as to the data output controller, the user interface, or the alert notification. For example, intermediate results may include the identified suspicious local areas or a graphical representation of sensor data corresponding to the identified suspicious local areas.

Figure 7:
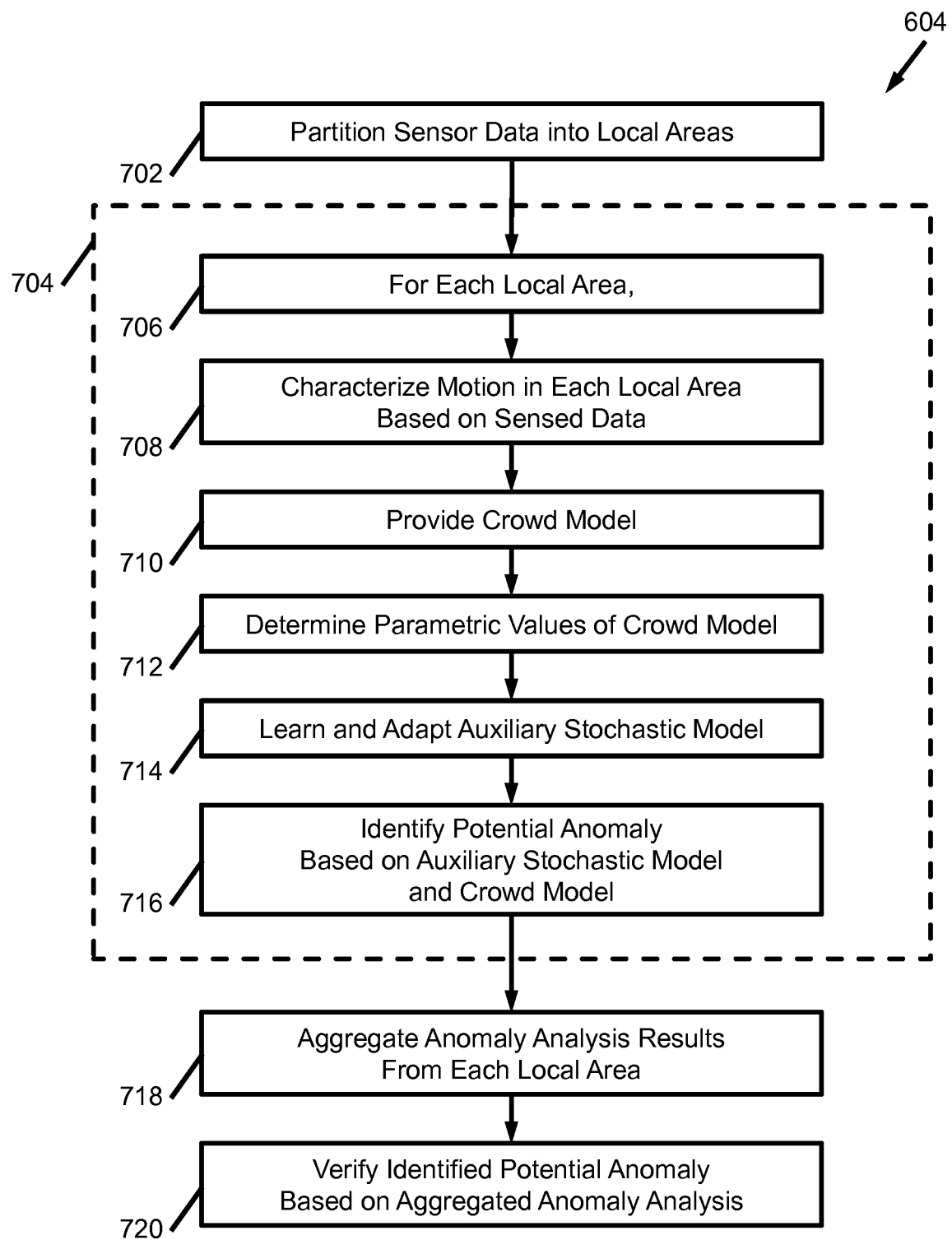
FIG. 7 illustrates a non-limiting example of a process that the system performs for detecting anomalies in crowd behavior at the large-scale level in accordance with certain embodiments of the present disclosure.

FIG. 7 illustrates a non-limiting example of a process 604 that the system performs for detecting anomalies in crowd behavior at the large-scale level in accordance with certain embodiments of the present disclosure. The received sensor data is collected and partitioned in small local areas before engaging the large-scale crowd anomaly analysis (step 702).

The local areas represent partitions of the sensor data. For example, the present system can spatially partition a video stream into a grid representing local areas of the crowd. A local area can contain many sub-populations of the crowd. All members of a sub-population feature a distinct motion pattern, which distinguishes them from all members of other sub-populations. The present system scales the size of the local area by the spatial resolution of the sensed data. For example, a minimum value for the size of the local area can be given by the smallest area needed to estimate reliably a density and/or a velocity of the crowd or be based on the number of parameters used in the crowd model. In some embodiments, if the present system uses a number of parameters or coefficients to estimate the density of the crowd, the minimum value for the size of the local area is defined to be larger than the number of estimated parameters used to estimate the density. Other restrictions, such as restrictions imposed by the geometry of the inspected area, may also affect the size of the partitioned local area.

In some embodiments, the partitioning divides the sensor data into overlapping local areas. Partitioning local areas to overlap improves subsequent processing. Overlapping local areas increase prediction accuracy and also avoid artifacts in the sensor data that may block or occlude individuals. When using overlapped block partitioning, local area sizes are typically partitioned to be twice as big in each dimension as they otherwise would be, and local areas overlap quadrant-wise with neighboring local areas.

For each local area identified through the partitioning (step 706), the present process performs the steps delineated by dotted rectangle 704. Specifically, the present process characterizes motion in the local area based on the sensed data (step 708), provides a crowd model for the local area (step 710), determines parametric values of the crowd model (step 712), learns and adapts a set of auxiliary stochastic models approximating evolution over time of the parametric values of the crowd model (step 714), and identifies potential anomalies based on the auxiliary stochastic models and the crowd model (step 716). Each step is described in further detail as follows.

First, the present process characterizes the motion in the local area based on the sensed data (step 708). In some embodiments, the present system characterizes the motion by determining real-time estimates of a velocity field and a density field representing the local area based on the sensed data.

A velocity field describes a field of velocity vector functions of position and time representing motion in the local area. In some embodiments, if the sensor data includes video data, the present system determines the velocity using video processing algorithms such as feature matching, template matching, temporal alignment, or statistical comparison algorithms. These algorithms can use video data including color (Red-Green-Blue, Hue-Saturation-Value, etc.), gray-level (image intensity), or derivative information from the video stream, or a combination thereof. A non-limiting example video processing algorithm for determining the velocity field is robust dense optical flow, presented by Baker and Matthews (Baker, S and Matthews, I., "*Lucas-Kanade 20 years on: A unifying framework*," International Journal of Computer Vision 56.3 (2004): pp. 221-255, the entire contents of which are hereby incorporated by reference). Other example algorithms can exploit motion estimation or compensation techniques used digital video encoding or compression. Example video codecs allowing exploitation of motion estimation or compensation techniques include H.263, MPEG-4 Part 2, H.2641 MPEG-4 Advanced Video Coding (AVC), VC-1, or other video codes based on discrete cosine transforms (DCT). Still other example algorithms can use dynamic texture-based methods including motion models. Example dynamic texture-based methods are presented in Cremers, Rousson, and Deriche, and Nelson and Polana (Cremers, D., Rousson, M. and Deriche, R., "*A review of statistical approaches to level set segmentation: integrating color, texture, motion and shape*," International journal of computer vision 72.2 (2007): pp. 195-215; Nelson, R. C., and Polana R., "*Qualitative recognition of motion using temporal texture*," CVGIP: Image understanding 56.1 (1992): pp. 78-89, the entire contents of both of which are hereby incorporated by reference).

As described earlier, the sensor data can include data other than optical or video data. Accordingly, the present system can determine a real-time estimate of a velocity field for a local area directly or indirectly. Example indirect determination of a velocity field may include inferring the velocity field based on positional information from the sensor data. In some embodiments, the present system can determine a velocity field from radar sensors based on the Doppler effect. In other embodiments, the present system can determine velocity using positional information from sources such as Radio Frequency Identification (RFID) data, or contact or contactless sensors. Examples of determining velocity based on positional information are presented by Mori, et al. (Mori, T. et al., "*Multiple people tracking by integrating distributed floor pressure sensors and RFID system*," Systems, Man and Cybernetics, 2004 IEEE International Conference on, vol. 6, IEEE, 2004, the entire contents of which are hereby incorporated by reference).

A density field describes a field of density vector functions of position and time, representing density of the local area. In some embodiments, if the sensor data includes video data, the present system determines real-time estimates of the spatial crowd density by interpreting density to be an image or video texture property. For example, the more complex a video frame or video stream is determined to be, the higher the density value that can be assigned. Accordingly, density can be estimated from small-area statistical properties of the coefficients of wavelets or Fourier-related transforms, resolving a range of length scales. If the sensor data does not include optical or video data, the present system can leverage other characteristics of the sensor data to determine a density estimate of the local area.

The present process provides a crowd model which models the behavior of the crowd based on fluid dynamics (step 710). The crowd model represents the local areas as a set of sub-populations, each sub-population having a characteristic behavior, such as a desired route or a stochastic behavioral pattern. An example desired route includes a group of people going from a specified train or subway platform to a specified exit gate in the station. An example of stochastic behavior can be seen when grocery shoppers focus on buying groceries in a different behavioral pattern versus the behavioral pattern of window shoppers browsing in a mall.

The crowd behavior model includes a collection or set of continuous functions of space and time, representing the time-varying velocities and contributions to the density of each sub-population of the crowd at each point in the inspected local area. The crowd behavior model denotes time by t and a location in space on a flat surface by $(x,y)^T$ and in three dimensions by $(x,y,z)^T$, in which the notation r denotes the transpose, namely $$\begin{bmatrix} x \\ y \end{bmatrix} \text{ or } \begin{bmatrix} x \\ y \\ z \end{bmatrix}.$$

Subsequently, without loss of generality, the crowd behavior model denotes a spatial location by a vector field $x=(x,y)^T$.

A local area can contain multiple sub-populations. The crowd behavior model describes the combined motion of N sub-populations, indexed by $i \in \mathcal{I} = \{1, \ldots, N\}$. As described earlier, the present system characterizes the motion of the sub-populations using real-time estimates of a velocity field and a density field. The velocity field of sub-population i, $i \in \mathcal{I}$, is denoted by $u_i$. The velocity field is a vector-field with values of the same dimension as the spatial location vector, x. That is, if x denotes space in two dimensions $(x,y)^T$, $u_i$ denotes velocity in the direction of the x- and y-axes by u and v, respectively. If x denotes space in three dimensions $(x,y,z)^T$, $u_i$ denotes velocity in the direction of the x-, y-, and z-axes by u, v, and w, respectively. The density field $\rho_i$ denotes the density of agents, such as humans, in a crowd per unit area. Both $u_i$ and $\rho_i$ are functions of the spatial position x and time t, thus $u_i = u_i(x,t)$ and $\rho_i = \rho_i(x,t)$. The total density is defined as the sum of all the sub-population densities in the local area at a given point in space and time, i.e.

$$\rho(x, t) = \sum_{i=1}^{N} \rho_i(x, t).$$

An upper bound on the total feasible or tolerable density is denoted $\rho_{max}$. $\rho_{max}$ may be based, for example, on long-term observations of crowd motion patterns in a particular location, time of day, day of week, season, etc., on safe bounds or areas set by the designer of a public area under inspection, by a user operating the present system, or derived from moving averages over long-time windows. The crowd behavior model defines pressure as $$p(x, t) = \frac{\rho(x, t)}{\rho_{max} - \rho(x, t)} = \frac{\frac{\rho(x, t)}{\rho_{max}}}{1 - \frac{\rho(x, t)}{\rho_{max}}}.$$

The pressure term models "social pressure" or "crowd pressure" which individuals in a crowd may feel when they are more tightly or less tightly in the presence of one another, and the tendency of individuals to avoid densely-packed areas. Conversely, individuals exhibit a tendency to move towards less densely-packed areas. The relative sub-population and total densities, denoted $$\rho_{i,norm}(x, t) = \frac{\rho_i(x, t)}{\rho_{max}(x, t)}$$

and $$\rho_{norm}(x, t) = \frac{\rho(x, t)}{\rho_{max}(x, t)},$$

respectively, may be introduced to simplify the expression for the pressures, as $$p(x, t) = \frac{\rho_{norm}(x, t)}{1 - \rho_{norm}(x, t)}.$$

Based on the sensor data, the present system measures and obtains an observed velocity, $\bar{u}$, at a point, x. The observed velocity represents an average of velocity all sub-populations in the local area. That is, the observed velocity is determined using short-time observations of evolution of motion over a small area and a small time. The small area can be the local area of the sensor data under analysis. The small time can be successive frames in the video stream, which can be anywhere from $\frac{1}{16}$ of a second to $\frac{1}{30}$ of a second to $\frac{1}{60}$ of a second. The observed velocity is therefore related to the densities and velocities of the sub-populations at a given in space and time, i.e.

$$\bar{u}(x, t) = \sum_{i=1}^{N} \frac{\rho_i(x, t)}{\rho(x, t)} u_i(x, t).$$

The conservation of mass of a small moving subset of each sub-population is given by the continuity equation $$\partial_t \rho_i(x,t) + \nabla_x \cdot (\rho_i(x,t) u_i(x,t)) = 0, \quad \text{(Equation 1)}$$

for $i \in \mathcal{I}$, where $\partial_t$ and $\nabla_x$ denote the partial derivative with respect to time and the Nabla operator with respect to space, respectively. Note that, by definition of the densities $\rho_i$, the mass at a time t of the sub-population i in an area or a volume $\tilde{\Omega} \subset \Omega$, within the observed area $\Omega$, is the spatial integral $\int_{\tilde{\Omega}} \rho_i(\xi, t) d\xi$. The mass thus represents the locally smoothed number of individuals of the sub-population i, that is contained within the given volume or area, $\tilde{\Omega}$. In these terms, the continuity equation states that if, at a certain time $t_0$, a portion of the sub-population i is contained in a certain area or volume $\tilde{\Omega}(t_0)$, and if one tracks the time evolution of points in $\tilde{\Omega}(t_0)$, as the points move in space and time according to the velocity field $u_i(x,t)$, to form an area or volume $\tilde{\Omega}(t_1)$, at a later time, $t_1 > t_0$, then the number of persons of the sub-population i that occupy $\tilde{\Omega}(t_1)$ at the time $t_1$ remains equal to the number of those that occupied $\tilde{\Omega}(t_0)$ at the initial time $t_0$.

The crowd model also includes a momentum equation for the large-scale crowd, which is given by $$\partial_t (\rho_i(x, t) u_i(x, t)) = -\nabla_x \cdot (\rho_i(x, t) u_i(x, t) \otimes u_i(x, t)) + \quad \text{(Equation 2)}$$
$$\frac{1}{\tau_i} \rho_i(x, t)(\tilde{u}_i d_i - u_i(x, t)) -$$
$$\frac{\rho_i(x, t)}{\rho(x, t)} (\beta_i \nabla_x p(x, t) + \mu_i(u_i(x, t) - \bar{u}(x, t))) +$$
$$\rho_i(x, t) \zeta_i(\rho(x, t), x, t),$$

for $i \in \mathcal{I}$, where the $\cdot$ and $\otimes$ operators represent the inner product and outer product vector operations, respectively. The meaning of the terms of Equation 2 is explained in the description following. All the parameters of Equation 2, $\tau_i$, $\beta_i$, $\mu_i$, $\tilde{u}_i$, $d_i$, and $\zeta_i$, may be estimated in real time by the present system. The parametric values vary slowly with time and smoothly in space. Thus. $\tau_i = \tau_i(x,t)$, $\beta_i = \beta_i(x,t)$, $\mu_i = \mu_i(x,t)$, $\tilde{u}_i = \tilde{u}_i(x,t)$, $d_i = d_i(x,t)$, and $\zeta_i = \zeta_i(x,t),x,t)$. As discussed below, the present system identifies auxiliary stochastic models that describe the substantially normal temporal evolution of these parameters from the estimated real-time parameter values for each local area, and possibly, using pre-determined a priori information.

Non-limiting examples of a priori information include long-term sensor data, such as sensor data from observing an area under surveillance for a long time. Example time intervals for observing an area include minutes, days, weeks, months, seasons, or years. For example, a long-term observation based on seasons may include every year in the fall, observing a crowd of birds gathering in flocks and migrating South. In this instance, every year in the fall, $\tilde{u}_1$ and $d_i$ are likely to be similar. Accordingly, the present system can perform faster by avoiding extraneous or duplicated estimation of these parametric values from the sensor data. In another example, a long-term observation based on hours may include observations of crowds of commuters in train, bus, or subway stations, when a train, bus, or subway arrives according to the same schedule for every weekday. The behavior of crowds before work (before 9 am) or around lunch time (around 12 pm) or after work (after 5 pm) may remain similar for weeks, months, seasons, or years. In this instance, the relevant long-term observation can include time spans from on the order of minutes, to years, if the present system determines that the commuter crowd features a similar behavioral pattern at all times on a weekday.

The convection term, $$\nabla_x \cdot (\rho_i(x,t) u_i(x,t)) \otimes u_i(x,t),$$

represents the spatial component of the acceleration of a mass occupying an infinitesimal volume around the point x at time t and propagates according to $u_i$. In other words, the convection models the spatial shifting of momentum in a local area for a sub-population i due to the bulk velocity of the crowd. Specifically, if the spatial volume is centered around position vector z(t), then the center of that volume satisfies $$\frac{d}{dt} z(t) = u(z(t), t)$$

and the total time derivative of the momentum of that mass $$\frac{d}{dt}(\rho_i(z(t), t) u(z(t), t)),$$

is the sum of the left hand side of Equation 2 and the convection term evaluated at x=z(t).

The extraneous forces term, $$\frac{\rho_i(x, t)}{\tau_i(x, t)}(\tilde{u}_i(x, t) d_i(x, t) - u_i(x, t)),$$

represents a tendency of crowd members of sub-population i to adhere to a known motion pattern. The known motion pattern can be defined by the velocity field $\tilde{u}_i d_i$. The extraneous forces term is determined by the scalar parameter $\tau_i$, the scalar target velocity amplitude $\tilde{u}_i$, and vector-valued target velocity orientation $d_i$.

As will be discussed later, an auxiliary stochastic model encapsulates time variations in some parameters of Equation 2, such as $\tau_i$. The auxiliary stochastic model slowly adapts using time-filtered, real-time estimates of these parameters. Like all other parameters of Equation 2, the extraneous forces parameters may vary in time and in space. Accordingly, the present system can estimate parametric values of the parameters of the extraneous forces term, such as $\tau_i$, $\tilde{\mu}_i$, and $d_i$, based on real-time estimates of velocity and density of the local area. Parameters representing target behavior, such as $\tilde{u}_i$ and $d_i$, may be primarily based on long-time observations. The long-term observations can be gathered based on long-term sensor data, such as sensor data from observing an area under surveillance for a long time. As described earlier, example time intervals for observing an area can include minutes, hours, days, weeks, months, seasons, or years. Accordingly, the parameters representing target behavior may depend on the location relative to the global spatial geometry, or on time of day, day of week, season, etc. These target behavior parameters may also include a functional dependence on the state of the flow, representing long-time averaged shifts in sub-population path and velocity, in response to varying levels of traffic density of the crowd.

The term $$-\frac{\rho_i(x, t)}{\rho(x, t)}(\beta_i \nabla_x p(x, t) + \mu_i(u_i(x, t) - \bar{u}(x, t)))$$

includes a pressure term and a viscosity term describing crowd behavior. The pressure term, $$-\frac{\rho_i(x, t)}{\rho(x, t)} \beta_i \nabla_x p(x, t),$$

models the tendency of the moving crowd to prefer motion orientation from high to low density, hence along the negative pressure gradient. In other words, the pressure term represents a congestion repelling force, as individuals in a crowd avoid highly packed areas and instead prefer less crowded areas. In the extreme, this term represents a collision avoidance force. The parameter $\beta_i$ scales this force. As with all other equation parameters, $\beta_i$ is expected to vary with space and time. The normal time variation of $\beta_i$ is described by the auxiliary stochastic model, as described later. Accordingly, the value of parameter $\beta_i$ can be estimated based on real-time estimates of velocity and density of the local area, and compared with output from the auxiliary stochastic model by the present system. The viscosity term, $$-\frac{\rho_i(x, t)}{\rho(x, t)} \mu_i(u_i(x, t) - \bar{u}(x, t)),$$

models the force exerted by the motion of those immediately surrounding an individual, on that individual. Namely, it represents the difficulty of an individual to move at a velocity and orientation that are different than those of the average motion, around that individual. The parameter $\mu_i > 0$ scales this force and is subject to spatio-temporal variations. The normal time variation of $\mu_i$ is described by the auxiliary stochastic model, as described later. Accordingly, the value of parameter $\mu_i$ can be estimated based on real-time estimates of velocity and density of the local area, and compared with output from the auxiliary stochastic model by the present system.

The stochastic acceleration term, $$\rho_i(x,t) \zeta_i(\rho(x,t), x, t),$$

adds small randomness to the motion of individuals in the crowd behavior model. The stochastic acceleration represents an intensifying randomness, to avoid congestion and collision, as an individual approaches a high-density area in a crowd, and reduced randomness during the individual's motion through low-traffic areas in the crowd. For example, the dependence of the vector-valued stochastic field $\zeta_i$ on the total density $\rho$ may reflect a tendency of individuals in the crowd to increase random sideways motion, to avoid approaching congestion or collision. Similarly, the converse may act to reduce such motion in areas which are less congested or more sparsely populated.

As described earlier, the present system characterizes motion in each local area by determining a set of real-time estimates of motion of sub-populations found in the local area. The real-time estimates of motion can include real-time estimates of a velocity field and a density field. The present system determines the real-time estimates of the velocity field and density field as follows. The distributed state of the large-scale crowd model includes the density fields, $\rho_i(x,t)$ and the velocity field, $u_i(x,t)$ for $i \in \mathcal{J}$. To determine the density field, real-time density estimates may be directly computed from local data only for the total density $\rho$. The determination of further density estimates is described in further detail below. To determine the velocity field, a locally averaged velocity of the combined sub-population can be determined first, i.e., for $\bar{u}$. For example, the present system can use optical field estimates. After determining the total density $\rho$ and locally averaged velocity, the present system can then determine estimates for velocities and densities for each sub-population based on the distributed estimates of $\rho$ and $\bar{u}$, over small areas such as the local areas partitioned by a pre-determined spatial grid. For example, providing low-order polynomial representations of local variations in $\rho_i(x,t)$ and $u_i(x,t)$, the present system can estimate coefficients of the polynomials from direct estimates of $\rho_i$ and $u_i$ at multiple grid points in space, and, possibly, several successive samples in time, such as successive frames of a video stream. These successive samples in either time or space form a small neighborhood of the tuple $(x,t)$.

The present process then determines parametric values of the crowd model based on the real-time estimates of the motion of the sub-populations in the local area (step 712). The present system uses the parametric values to correlate with a short-time evolution of the motion of all sub-populations found in the local area. The present system estimates coefficients of the crowd model using best-fit to real-time estimates of the model state from the received sensor data. As described earlier, the model state can include distributed velocity fields and density fields. The present system identifies behavioral patterns in the local area in terms of coefficient values of the crowd model. The present system then uses estimation methods to estimate parametric values of the crowd model. Example estimated parameters may include $\tau_i$, $\beta_i$, $\mu_i$, $\tilde{\mu}_i$, $d_i$, and $\zeta_i$ for all sub-populations $i \in \mathcal{J}$. In some embodiments, the estimation methods may be based on estimation methods to solve an over-determined system, i.e., a set of equations in which there are more equations than unknowns. The unknown variables are the parameters of the crowd model. Non-limiting examples of estimation methods may be based on classical estimation methods or Bayesian estimation. Example classical estimation methods can include minimum variance unbiased estimation, maximum likelihood estimation, and least squares estimation, such as methods presented by Bjorck (Bjorck, A., "*Numerical methods for least squares problems*," No. 51, Society for Industrial Mathematics, 1996, the entire contents of which are hereby incorporated by reference). Example Bayesian estimation methods can include minimum mean-square estimation, maximum a posteriori estimation, optimal filtering, Wiener filtering, and Kalman filtering, such as methods presented by Kay (Kay, S. M. "*Fundamentals of Statistical Signal Processing, Volume I: Estimation Theory (v. 1)*," (1993), the entire contents of which are hereby incorporated by reference). The present system may prefer robust methods, as the crowd model includes a stochastic term.

The present process then learns and adapts an auxiliary stochastic model from a set of auxiliary stochastic models based on evolution over time of the parametric values of the crowd model (step 714). The parametric values in the crowd model can vary and evolve dynamically over time and space. The present process uses auxiliary low-order stochastic models and tolerances which governs the dynamics of temporal variations in parametric values of the crowd model coefficients which are determined to be expected, typical, or normal. The present process learns these auxiliary stochastic models during an initial training period, and continually updates the auxiliary stochastic models during operation of the present system. Non-limiting example learning methods include methods based on principal components analysis (PCA), linear discriminant analysis (LDA), subspace learning (such as local linear embedding), Galerkin methods, Hankel matrix-based methods, and machine learning algorithms (such as support vector machines, Bayesian networks, or evolutionary algorithms).

The present process then identifies a potential anomaly based the auxiliary stochastic model and on the crowd model (step 716). The present system identifies a potential anomaly by detecting an abrupt change in the parameters of the crowd model in the local area. In some embodiments, the present system identifies a potential anomaly if the abrupt change invalidates the predictions of the auxiliary stochastic model learned in step 714, if tolerances on parametric values of the crowd model and auxiliary stochastic model learned in steps 708 and 714 are exceeded, and/or based on long-term observations of the area under surveillance. In further embodiments, the present method may include a set of pre-defined anomalies, such as heavy motion in a particular direction, strong rotational motion, high crowd density, shock waves, etc. If the present system detects changes in parametric values indicative of a pre-defined anomaly, the present system identifies those parameter variations as a potential anomaly.

In further embodiments, the present system can identify a potential anomaly using mismatches of the sensor-data-driven state, such as the real-time estimates of the velocity and/or density determined by characterizing motion in the local area, complexity measures, or first- or higher-order (spatial or temporal) derivatives of velocity or density (step 710), or estimates of parametric values from the crowd model (step 712) or from the auxiliary stochastic model (step 714). For example, in some embodiments, the present system can compare the sensor-data-driven state estimates to short-term predictions generated by the crowd model. In some embodiments, the present system can compare the sensor-data-driven state estimates to short-term predictions generated by the crowd model by using a suitable Navier-Stokes equation solver to short-time integrate the large-scale crowd model. In other embodiments, the present system may use a residual error of the crowd model and/or of the auxiliary stochastic model when applied to the sensor-data-driven estimates.

In some embodiments, after performing the anomaly analysis for each local area, the output is aggregated based on the partitions determined in step 702 (step 718). For example, the aggregating may include a spatial aggregation using weighted average filtering of the received input. The aggregating may include determining a weighted average statistically, spatially, and/or temporally. In further embodiments, the aggregating may include an interpolation of the received input.

The aggregated data from the anomaly analysis for each local area may then be inspected on a global scope to identify a potential anomaly or to verify an identified potential anomaly (step 720). Step 720 performs anomaly detection on an area larger than a local area, or on the whole inspected area including the entire crowd. In some embodiments, the present system can use long-term observation of the surveillance area or stochastic adaptive estimation to determine tolerances on the magnitude of spatial and/or temporal gradients of the aggregated crowd model states and/or aggregated vector of parametric values of the crowd model. Accordingly, violation of these tolerances can then be used as indicators of potential anomalies in local area crowd motion.

As described earlier in connection with FIG. 6, a potential anomaly identified according to process 604 is then further processed at the meso-scale and individual levels.

Those of skill in the art would appreciate that the various illustrations in the specification and drawings described herein can be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware, software, or a combination depends upon the particular application and design constraints imposed on the overall system. Skilled artisans can implement the described functionality in varying ways for each particular application. Various components and blocks can be arranged differently (for example, arranged in a different order, performed in a different order, or partitioned in a different way) all without departing from the scope of the subject technology.

Moreover, in the drawings and specification, there have been disclosed embodiments of the inventions, and although specific terms are employed, the term are used in a descriptive sense only and not for purposes of limitation. For example, various controllers, nodes, and modules have been described herein as running on single machines, but embodiments where the controllers, nodes, and modules comprise a plurality of machines connected together is within the scope of the disclosure (e.g., in a parallel computing implementation or over the cloud). Moreover, the disclosure has been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

We claim:

1. A computer-implemented method of detecting an anomaly in crowd behavior, the method comprising:
receiving sensor data from one or more sensors, the sensor data representing a crowd in motion;
partitioning the sensor data into a set of local areas, each local area forming a neighborhood for analyzing the crowd in motion;
for each local area in the set of local areas,
characterizing motion in the local area to determine a set of real-time estimates of motion of sub-populations in the local area based at least in part on the sensor data, each sub-population characterized by a pattern of motion based at least in part on sensor data collected over a longer-term time duration describing motion in the sub-population, the longer-term time duration including at least one of minutes, hours, days, weeks, seasons, and years;
providing a crowd model for each local area, each model representing dynamics of continuous functions describing expected motion near each local area;
determining a set of parametric values of the crowd model based at least in part on the real-time estimates of the motion of the sub-populations in the local area, to correlate the set of parametric values with a short-time evolution of the motion of the sub-populations in the local area;
learning and adapting a set of auxiliary stochastic models based at least in part on evolution of the parametric values of the crowd model over time, the set of auxiliary stochastic models characterizing substantially normal evolution of the parametric values of the crowd model over time associated with each local area; and
identifying an occurrence of a potential anomaly associated with the local area by comparing predictions from an auxiliary stochastic model in the set of auxiliary stochastic models with the set of parametric values of the crowd model based at least in part on the real-time estimates of the motion of the sub-populations in the local area.

2. The method of claim 1, further comprising:
allocating at least one of additional sensor resources and additional computational resources to further analyze motion in the local area associated with the identified potential anomaly to verify whether to flag the identified potential anomaly, if the predictions from the auxiliary stochastic model do not match the set of parametric values of the crowd model based at least in part on the real-time estimates of the motion of the sub-populations in the local area; and
wherein if the further analysis of the motion in the local area associated with the identified potential anomaly determines that the identified potential anomaly should be flagged, analyzing motion of one or more individuals in the local area to verify whether the identified potential anomaly is an actual anomaly.

3. The method of claim 1,
wherein the sensor data includes data from a video stream;
wherein the partitioning the sensor data includes associating a subset of the sensor data with each local area in the set of local areas, each local area forming a neighborhood around a grid point in a spatial grid of the video stream representing an area under observation;
wherein the set of real-time estimates of the motion of the sub-populations includes real-time estimates of a velocity field and a density field;
wherein the crowd model is based at least in part on continuous-state, multi-population, compressible fluid dynamics to model expected motion near each local area, and wherein parameters of the crowd model include coefficients for quantifying an effect of crowd viscosity, crowd pressure, extraneous forces, and random motion that characterize local motion of each sub-population in the local area;
wherein the learning and adapting the set of auxiliary stochastic models includes determining a set of thresholds that represent substantially normal values of at least one of (i) the continuous functions describing expected motion near each local area, (ii) the parametric values of the crowd model, (iii) the coefficients of any auxiliary stochastic model in the set of auxiliary stochastic models, and (iv) spatial and temporal derivatives of at least one of (i), (ii), and (iii), for each local area, the set of thresholds being determined based at least in part on at least one of sensor data collected over the longer-term time duration and the real-time estimates of the motion of the sub-populations; and wherein the identifying the occurrence of the potential anomaly associated with the local area includes at least one of (i) determining whether a residual error identified by any of the auxiliary stochastic models in the set of auxiliary stochastic models exceeds a pre-determined threshold in the set of thresholds, and (ii) determining whether a residual error identified by the crowd model exceeds the pre-determined threshold.

4. The method of claim 1, further comprising:

aggregating parametric values from the crowd model and predictions from the set of auxiliary stochastic models for a plurality of local areas; and identifying an occurrence of a potential anomaly associated with the crowd, by comparing the aggregated predictions from the set of auxiliary stochastic models and the parametric values from the crowd model based at least in part on the real-time estimates of the crowd in motion for the plurality of local areas.

5. The method of claim 1, wherein the parametric values of the crowd model based at least in part on the real-time estimates of the motion of the sub-populations in the local area are determined based at least in part on at least one of minimum variance unbiased estimation, maximum likelihood estimation, least squares estimation, minimum mean-square estimation, maximum a posteriori estimation, optimal filtering, Wiener filtering, and Kalman filtering.

6. The method of claim 1, wherein the auxiliary stochastic models are learned based at least in part on at least one of principal components analysis, linear discriminant analysis, subspace learning, Galerkin methods, Hankel matrix-based methods, and machine learning algorithms.

7. The method of claim 2, wherein at least one of the motion in the local area and the motion of the individuals in the local area are analyzed based at least in part on agent-based crowd models with socio-economic forces, Boltzmann-like gas-kinetic models for crowd motion, lattice gas models for crowd motion, and cellular automata for crowd motion.

8. A system for detecting an anomaly in crowd behavior, the system comprising one or more sensors for observing a crowd in motion;
storage; and
at least one processor configured to:
receive sensor data from the one or more sensors, the sensor data representing the crowd in motion;
partition the sensor data into a set of local areas, each local area forming a neighborhood for analyzing the crowd in motion;
for each local area in the set of local areas,
characterize motion in the local area to determine a set of real-time estimates of motion of sub-populations in the local area based at least in part on the sensor data, each sub-population characterized by a pattern of motion based at least in part on sensor data collected over a longer-term time duration describing motion in the sub-population, the longer-term time duration including at least one of minutes, hours, days, weeks, seasons, and years;
provide a crowd model for each local area, each model representing dynamics of continuous functions describing expected motion near each local area;

determine a set of parametric values of the crowd model based at least in part on the real-time estimates of the motion of the sub-populations in the local area, to correlate the set of parametric values with a short-time evolution of the motion of the sub-populations in the local area;

learn and adapt a set of auxiliary stochastic models based at least in part on evolution of the parametric values of the crowd model over time, the set of auxiliary stochastic models characterizing substantially normal evolution of the parametric values of the crowd model over time associated with each local area; and identify an occurrence of a potential anomaly associated with the local area by comparing predictions from an auxiliary stochastic model in the set of auxiliary stochastic models with the set of parametric values of the crowd model based at least in part on the real-time estimates of the motion of the sub-populations in the local area.

9. The system of claim 8, wherein the at least one processor is further configured to:

allocate at least one of additional sensor resources and additional computational resources to further analyze motion in the local area associated with the identified potential anomaly to verify whether to flag the identified potential anomaly, if the predictions from the auxiliary stochastic model do not match the set of parametric values of the crowd model based at least in part on the real-time estimates of the motion of the sub-populations in the local area; and wherein if the further analysis of the motion in the local area associated with the identified potential anomaly determines that the identified potential anomaly should be flagged, analyze motion of one or more individuals in the local area to verify whether the identified potential anomaly is an actual anomaly.

10. The system of claim 8, wherein the sensor data includes data from a video stream;
wherein the at least one processor configured to partition the sensor data includes the at least one processor configured to associate a subset of the sensor data with each local area in the set of local areas, each local area forming a neighborhood around a grid point in a spatial grid of the video stream representing an area under observation;

wherein the set of real-time estimates of the motion of the sub-populations includes real-time estimates of a velocity field and a density field;

wherein the crowd model is based at least in part on continuous-state, multi-population, compressible fluid dynamics to model expected motion near each local area, and wherein parameters of the crowd model include coefficients for quantifying an effect of crowd viscosity, crowd pressure, extraneous forces, and random motion that characterize local motion of each sub-population in the local area;

wherein the at least one processor configured to learn and adapt the set of auxiliary stochastic models includes the at least one processor configured to determine a set of thresholds that represent substantially normal values of at least one of (i) the continuous functions describing expected motion near each local area, (ii) the parametric values of the crowd model, (iii) the coefficients of any auxiliary stochastic model in the set of auxiliary stochastic models, and (iv) spatial and temporal derivatives of at least one of (i), (ii), and (iii), for each local area, the set of thresholds being determined based at least in part on at least one of sensor data collected over the longer-term time duration and the real-time estimates of the motion of the sub-populations; and wherein the at least one processor configured to identify the occurrence of the potential anomaly associated with the local area includes the at least one processor configured to at least one of (i) determine whether a residual error identified by any of the auxiliary stochastic models in the set of auxiliary stochastic models exceeds a pre-determined threshold in the set of thresholds, and (ii) determine whether a residual error identified by the crowd model exceeds the pre-determined threshold.

11. The system of claim 8, wherein the at least one processor is further configured to:

aggregate parametric values from the crowd model and predictions from the set of auxiliary stochastic models for a plurality of local areas; and identify an occurrence of a potential anomaly associated with the crowd, by comparing the aggregated predictions from the set of auxiliary stochastic models and the parametric values from the crowd model based at least in part on the real-time estimates of the crowd in motion for the plurality of local areas.

12. The system of claim 8, wherein the parametric values of the crowd model based at least in part on the real-time estimates of the motion of the sub-populations in the local area are determined based at least in part on at least one of minimum variance unbiased estimation, maximum likelihood estimation, least squares estimation, minimum mean-square estimation, maximum a posteriori estimation, optimal filtering, Wiener filtering, and Kalman filtering.

13. The system of claim 8, wherein the auxiliary stochastic models are learned based at least in part on at least one of principal components analysis, linear discriminant analysis, subspace learning, Galerkin methods, Hankel matrix-based methods, and machine learning algorithms.

14. The system of claim 9, wherein at least one of the motion in the local area and the motion of the individuals in the local area are analyzed based at least in part on agent-based crowd models with socio-economic forces, Boltzmann-like gas-kinetic models for crowd motion, lattice gas models for crowd motion, and cellular automata for crowd motion.

15. A non-transitory computer program product for detecting an anomaly in crowd behavior, the non-transitory computer program product tangibly embodied in a computer-readable medium, the non-transitory computer program product including instructions operable to cause a data processing apparatus to:

receive sensor data from one or more sensors, the sensor data representing a crowd in motion;

partition the sensor data into a set of local areas, each local area forming a neighborhood for analyzing the crowd in motion;

for each local area in the set of local areas, characterize motion in the local area to determine a set of real-time estimates of motion of sub-populations in the local area based at least in part on the sensor data, each sub-population characterized by a pattern of motion based at least in part on sensor data collected over a longer-term time duration describing motion in the sub-population, the longer-term time duration including at least one of minutes, hours, days, weeks, seasons, and years;

provide a crowd model for each local area, each model representing dynamics of continuous functions describing expected motion near each local area;

determine a set of parametric values of the crowd model based at least in part on the real-time estimates of the motion of the sub-populations in the local area, to correlate the set of parametric values with a short-time evolution of the motion of the sub-populations in the local area;

learn and adapt a set of auxiliary stochastic models based at least in part on evolution of the parametric values of the crowd model over time, the set of auxiliary stochastic models characterizing substantially normal evolution of the parametric values of the crowd model over time associated with each local area; and identify an occurrence of a potential anomaly associated with the local area by comparing predictions from an auxiliary stochastic model in the set of auxiliary stochastic models with the set of parametric values of the crowd model based at least in part on the real-time estimates of the motion of the sub-populations in the local area.

16. The non-transitory computer program product of claim 15, wherein the non-transitory computer program product further includes instructions operable to cause the data processing apparatus to:

allocate at least one of additional sensor resources and additional computational resources to further analyze motion in the local area associated with the identified potential anomaly to verify whether to flag the identified potential anomaly, if the predictions from the auxiliary stochastic model do not match the set of parametric values of the crowd model based at least in part on the real-time estimates of the motion of the sub-populations in the local area; and wherein if the further analysis of the motion in the local area associated with the identified potential anomaly determines that the identified potential anomaly should be flagged, analyze motion of one or more individuals in the local area to verify whether the identified potential anomaly is an actual anomaly.

17. The non-transitory computer program product of claim 15, wherein the sensor data includes data from a video stream;

wherein the instructions operable to cause the data processing apparatus to partition the sensor data include instructions operable to cause the data processing apparatus to associate a subset of the sensor data with each local area in the set of local areas, each local area forming a neighborhood around a grid point in a spatial grid of the video stream representing an area under observation;

wherein the set of real-time estimates of the motion of the sub-populations includes real-time estimates of a velocity field and a density field;

wherein the crowd model is based at least in part on continuous-state, multi-population, compressible fluid dynamics to model expected motion near each local area, and wherein parameters of the crowd model include coefficients for quantifying an effect of crowd viscosity, crowd pressure, extraneous forces, and random motion that characterize local motion of each sub-population in the local area;

wherein the instructions operable to cause the data processing apparatus to learn and adapt the set of auxiliary stochastic models include instructions operable to cause the data processing apparatus to determine a set of thresholds that represent substantially normal values of at least one of (i) the continuous functions describing expected motion near each local area, (ii) the parametric values of the crowd model, (iii) the coefficients of any auxiliary stochastic model in the set of auxiliary stochastic models, and (iv) spatial and temporal derivatives of at least one of (i), (ii), and (iii), for each local area, the set of thresholds being determined based at least in part on at least one of sensor data collected over the longer-term time duration and the real-time estimates of the motion of the sub-populations; and wherein the instructions operable to cause the data processing apparatus to identify the occurrence of the potential anomaly associated with the local area include instructions operable to cause the data processing apparatus to at least one of (i) determine whether a residual error identified by any of the auxiliary stochastic models in the set of auxiliary stochastic models exceeds a pre-determined threshold in the set of thresholds, and (ii) determine whether a residual error identified by the crowd model exceeds the pre-determined threshold.

18. The non-transitory computer program product of claim 15, wherein the non-transitory computer program product further includes instructions operable to cause the data processing apparatus to:

aggregate parametric values from the crowd model and predictions from the set of auxiliary stochastic models for a plurality of local areas; and identify an occurrence of a potential anomaly associated with the crowd, by comparing the aggregated predictions from the set of auxiliary stochastic models and the parametric values from the crowd model based at least in part on the real-time estimates of the crowd in motion for the plurality of local areas.

19. The non-transitory computer program product of claim 15, wherein the parametric values of the crowd model based at least in part on the real-time estimates of the motion of the sub-populations in the local area are determined based at least in part on at least one of minimum variance unbiased estimation, maximum likelihood estimation, least squares estimation, minimum mean-square estimation, maximum a posteriori estimation, optimal filtering, Wiener filtering, and Kalman filtering.

20. The non-transitory computer program product of claim 16, wherein the auxiliary stochastic models are learned based at least in part on at least one of principal components analysis, linear discriminant analysis, subspace learning, Galerkin methods, Hankel matrix-based methods, and machine learning algorithms.

* * * * *